April 8, 1941.　　O. H. BANKER　　2,237,297
AUTOMATIC TRANSMISSION
Filed Sept. 15, 1937　　6 Sheets-Sheet 4
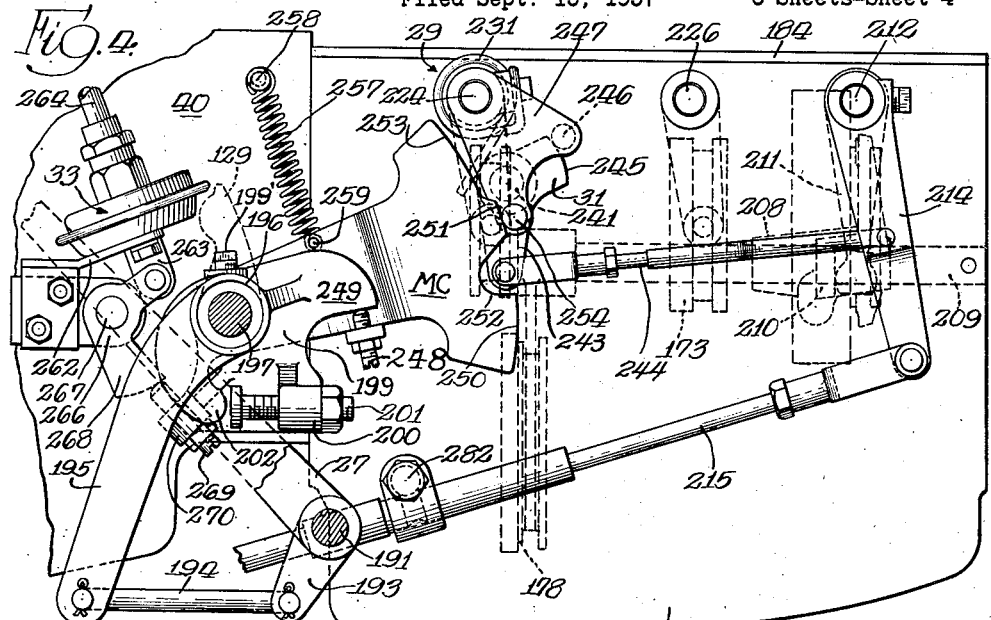
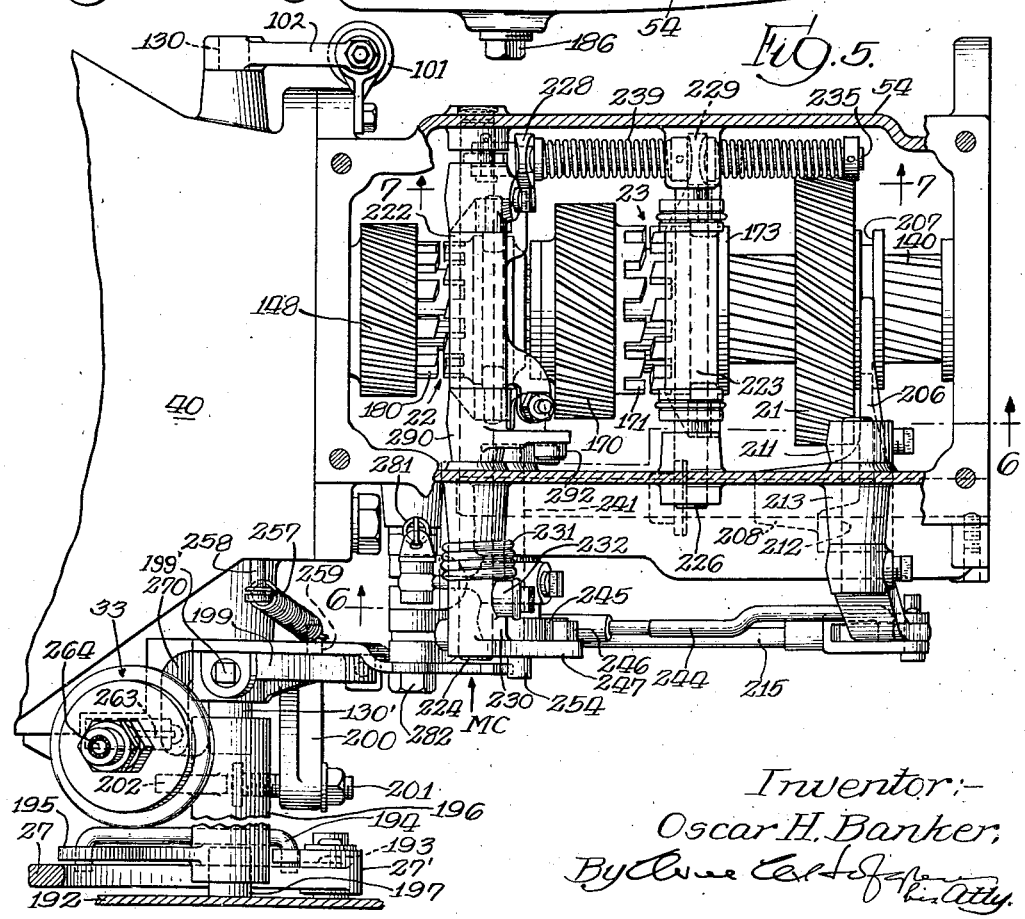
Inventor:—
Oscar H. Banker,
By [signature] Atty.

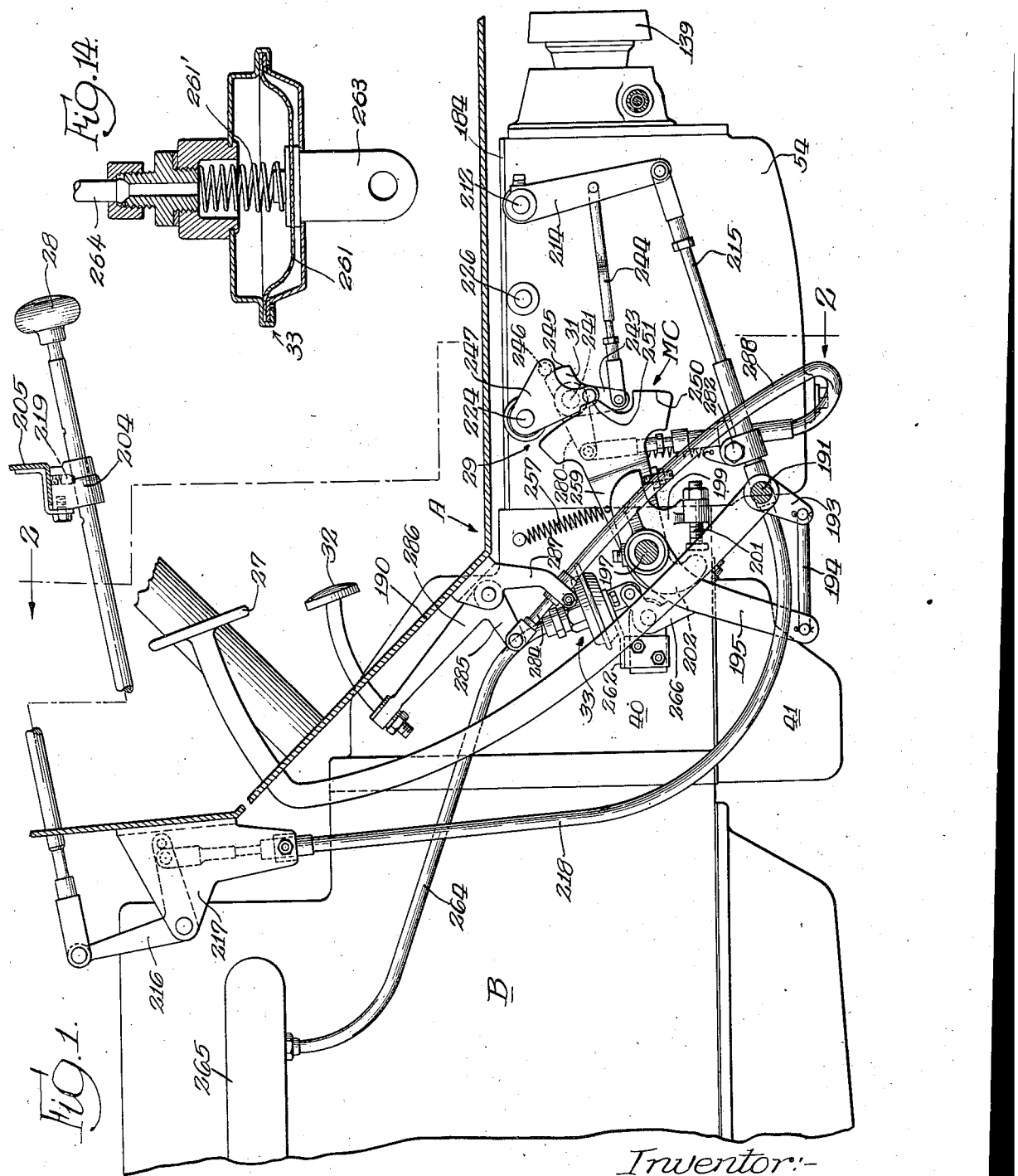

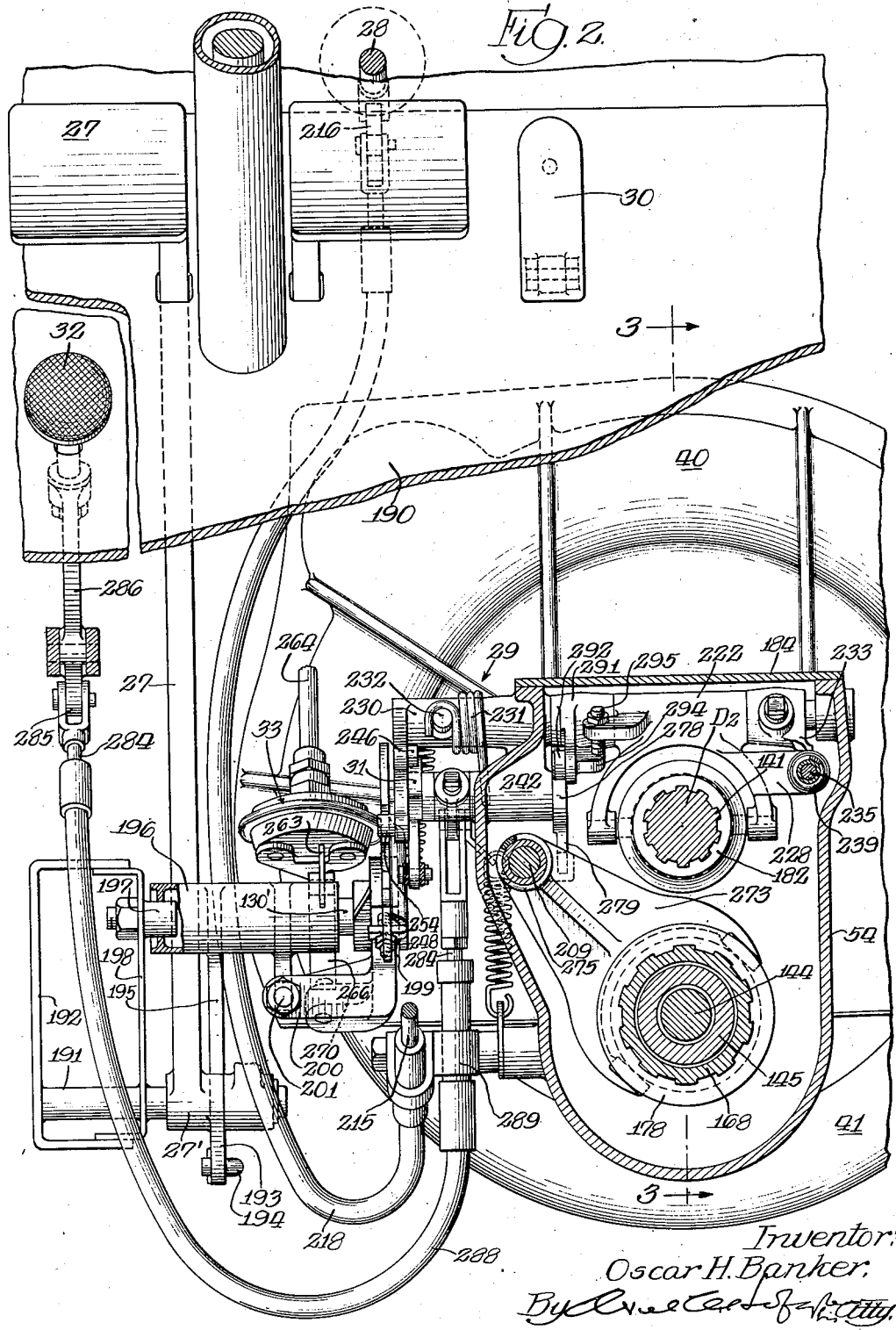

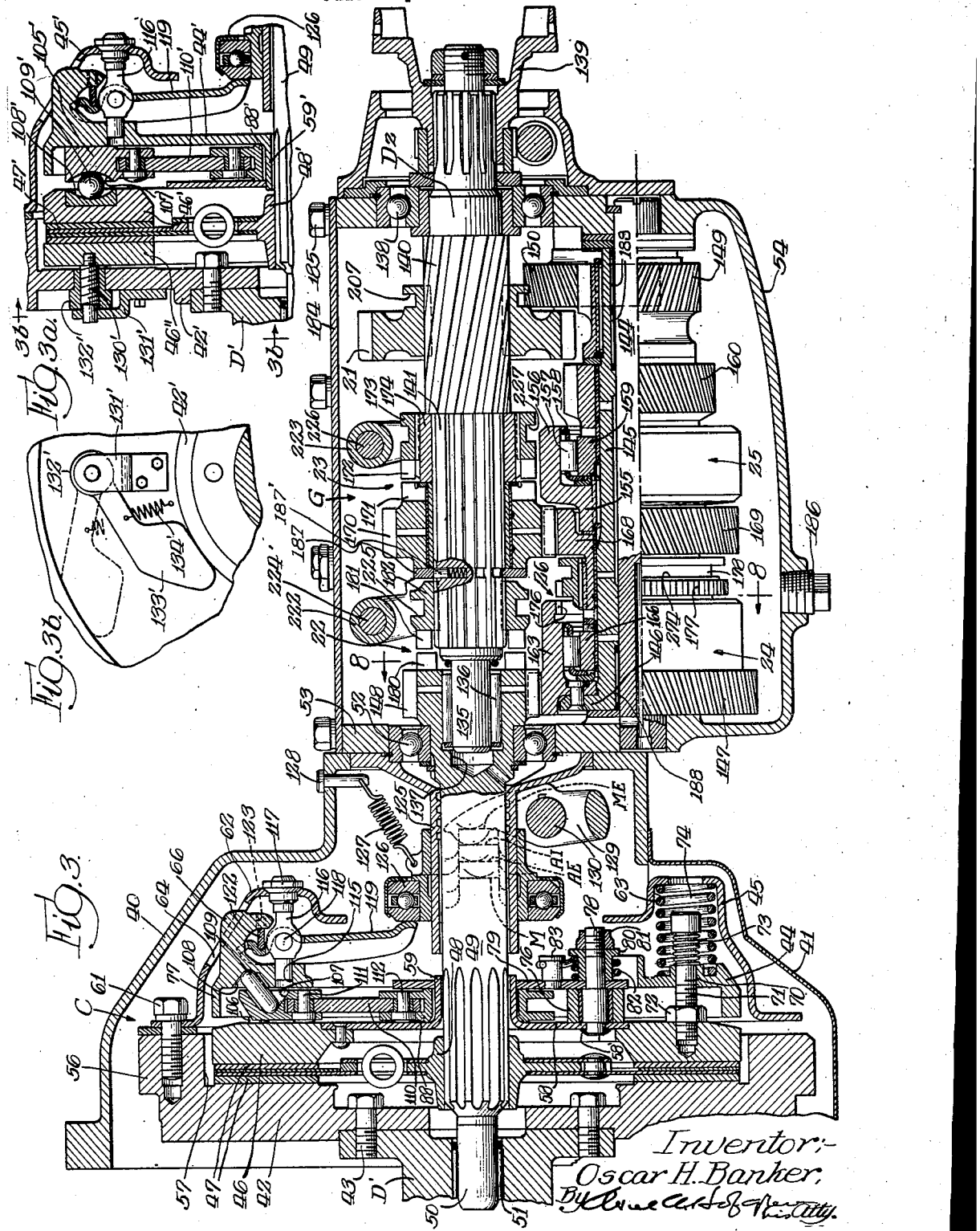

April 8, 1941.   O. H. BANKER   2,237,297
AUTOMATIC TRANSMISSION
Filed Sept. 15, 1937   6 Sheets-Sheet 5
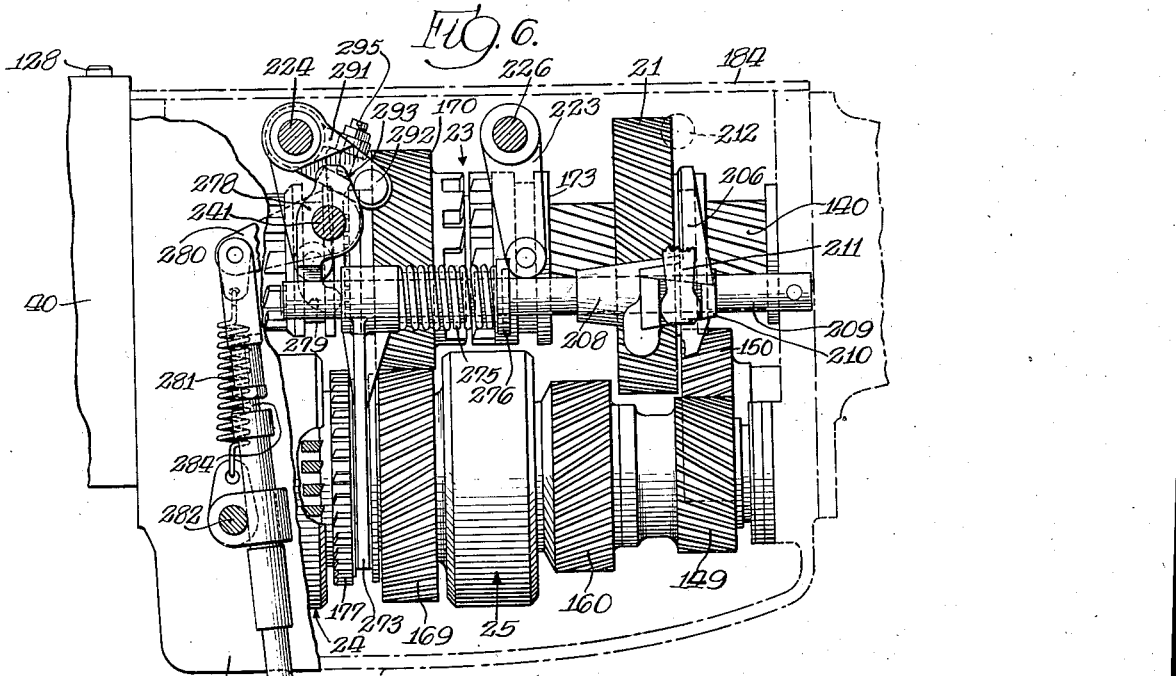
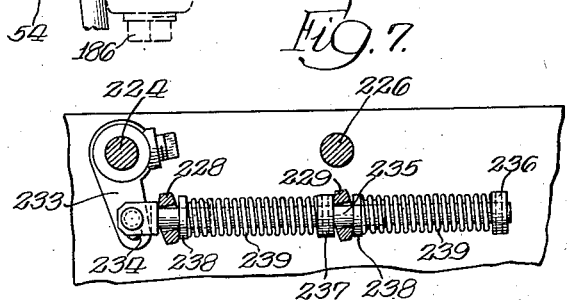
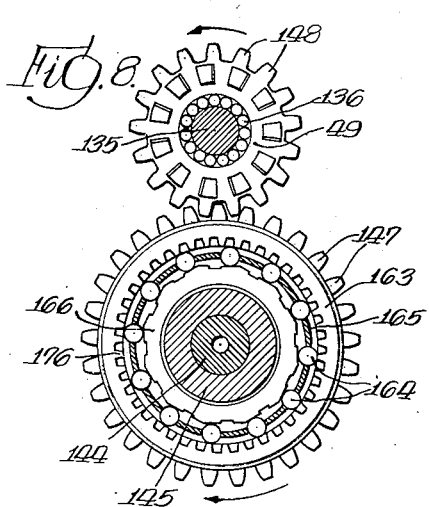
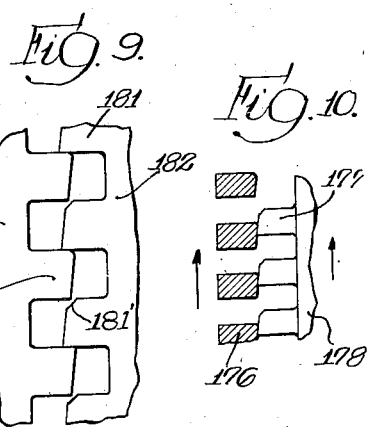
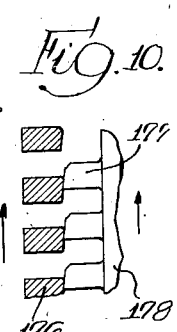
Inventor:-
Oscar H. Banker,

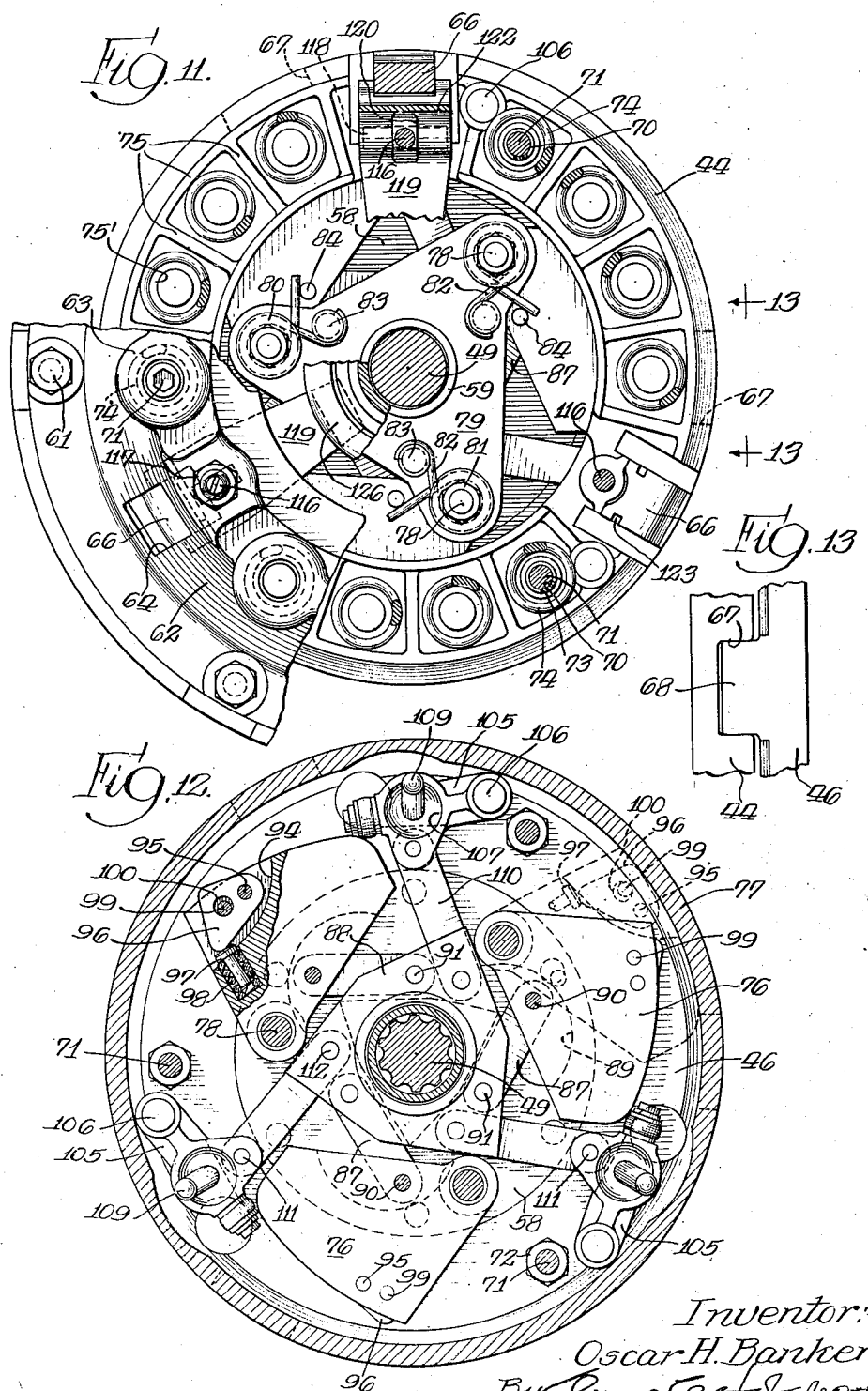

UNITED STATES PATENT OFFICE 2,237,297

AUTOMATIC TRANSMISSION

Oscar H. Banker, Chicago, Ill., assignor to New Products Corporation, Chicago, Ill., a corporation of Delaware Application September 15, 1937, Serial No. 164,025

24 Claims. (Cl. 192—3.5)

This invention relates to transmission devices and more particularly to an automatic transmission of a type particularly adapted for use in automotive vehicles.

It is an object of the invention to provide a new and improved automatic transmission for this purpose and, more particularly, an automatic transmission the weight of which is substantially that of present day hand shift transmissions, and which is reliable in its operation and which has a minimum number of parts which may get out of adjustment or for other reasons cause failure of the transmission to operate as intended.

Another object of the invention is to perfect an automatic transmission for an automotive vehicle in which the shift from low to second, or from second to high, is made automatically, but with the time of shift under the control of the operator of the vehicle embodying the transmission, at any time so long as the speed of the vehicle is above certain minimum speeds.

Another object is to provide an automatic transmission for use in an automotive vehicle in which engagement of the main clutch as well as shifts to change the gear ratios of the transmission are completely automatic but with the time of engagement or shift under the control of the operator of the vehicle through the accelerator pedal.

Yet another object is to provide an automatic transmission for use in an automotive vehicle having free-wheeling when the transmission is in low gear, a positive connection with the engine when the transmission is in high gear, and a second gear which normally provides free-wheeling but at the will of the operator may be made to provide a positive connection with the engine.

Another object of the invention is to provide an automatic transmission for an automotive vehicle having an automatic main clutch for connecting the engine to the transmission, in which the centrifugal weights controlling the main clutch also exercise control over the shifting of the transmission to change the gear ratio.

Another object of the invention is to perfect a transmission including a main clutch having an automatic position in which the clutch is engaged or disengaged, depending upon the speed of the motor associated with the transmission, and a permanently engaged position, and means responsive to engine operation normally retaining the clutch in automatic position during operation of the engine and operable under the control of the clutch pedal to permit the clutch to assume its permanently engaged position when the engine is dead.

Still another object is to provide an automatic transmission having automatic means for changing the gear ratio to obtain intermediate or high gear, manually operable means for selecting the direction of movement of the vehicle with which the transmission is associated, an automatic clutch, and means associated with said direction selecting means and said automatic clutch, controlling said ratio changing means to prevent shift to either intermediate or high when the direction selector means is in neutral or reverse, or when the engine of the vehicle is at idling or below.

A further object of the invention is to provide a new and improved intermediate gear lock-up whereby the transmission may be shifted to intermediate gear for either acceleration or deceleration purposes.

Still a further object is to perfect a transmission including an automatic clutch having means for connecting the driven shaft of the transmission to the motor when the latter is dead so that the motor may be used as a brake for parking the vehicle on an incline.

Yet a further object is to provide, in an automatic transmission having a main clutch and a plurality of jaw clutches for changing the gear ratio of the transmission, a main control cam controlled by the main clutch having a first position, assumed when the motor associated with the transmission is idling, in which the jaw clutches are held out of engagement, a second position, assumed when the motor is above idling speed, in which the jaw clutches are free to engage, and a third position, assumed when the motor is dead, in which the jaw clutches are partially engaged and in which the main clutch is engaged to provide, at will, a connection from the engine to the driven shaft of the transmission either in reverse gear for parking a vehicle with which the transmission is associated on an incline or in high gear for starting the engine by pushing the vehicle.

A further object of the invention is to provide in a transmission having an overrunning jaw clutch engageable to place the transmission in high gear, an intermediate gear train including an overrunning clutch and an intermediate gear lock-up clutch for cutting out the overrunning clutch to obtain a positive intermediate gear, manually operable means controlling the engagement of said lock-up clutch and controlling said high gear jaw clutch to permit operation of the transmission in intermediate gear while retaining the elements of said jaw clutch in a relationship assuring engagement upon release of the manually operable lock-up control.

Another object is to provide an automatic clutch of new and improved construction and capable of manual disengagement.

Yet another object is to provide an automatic clutch having a position in which it is automatically engaged or disengaged depending upon the speed of rotation of the clutch, and an engaged or a disengaged position obtained through manual manipulation.

It is still a further object of the invention to provide an automatic clutch which is engaged when stationary, disengaged when rotating below a predetermined speed, and again engaged when rotating above the predetermined speed.

Other objects and advantages will become apparent from the following description taken in connection with the accompanying drawings, in which:

Fig. 1 is a side elevational view of an automatic transmission embodying the features of the invention.

Fig. 2 is a transverse sectional view of the transmission taken approximately along the line 2—2 of Fig. 1, looking in the direction of the arrows.

Fig. 3 is a longitudinal sectional view taken approximately along the line 3—3 of Fig. 2, looking in the direction of the arrows.

Fig. 3a is a fragmentary view showing a modified form of automatic clutch.

Fig. 3b is a fragmentary view taken along line 3b—3b of Fig. 3a, looking in the direction of the arrows.

Fig. 4 is a fragmentary side elevational view of the transmission, drawn to emphasize certain of the control mechanism.

Fig. 5 is a top plan view of the transmission shown in Fig. 1 with the cover of the transmission removed and portions broken away better to reveal the interior of the transmission.

Fig. 6 is a view taken approximately along the line 6—6 of Fig. 5, looking in the direction of the arrows, in order to emphasize a certain portion of the control mechanism.

Fig. 7 is a fragmentary view taken approximately along the line 7—7 of Fig. 5.

Fig. 8 is a sectional view taken approximately along the line 8—8 of Fig. 3, looking in the direction of the arrows.

Fig. 9 is an enlarged detail view illustrating the position of the high speed clutch under a certain condition.

Fig. 10 is an enlarged detail view showing the position of the second speed lock-up clutch under certain conditions.

Fig. 11 is a composite view of the main automatic clutch with sectors thereof taken in successively different planes to show the relationship of all of the clutch parts.

Fig. 12 is a transverse sectional view showing the centrifugal weights of the automatic clutch.

Fig. 13 is an enlarged fragmentary detail view taken on the line 13—13 of Fig. 11.

Fig. 14 is an enlarged sectional view of the vacuum device shown in elevation in Fig. 1.

While the invention is susceptible of various modifications and alternative constructions, there is disclosed herein a preferred embodiment and one modification of a portion thereof, but it is not intended that the invention is to be limited to the specific constructions disclosed, but it is intended to cover all modifications and alternative constructions falling within the spirit and scope of the invention as defined by the appended claims.

Though the transmission may be employed for a variety of uses and in different environments, an important use is that in which the transmission is incorporated as a part of an automotive vehicle, and for purposes of disclosure, it will be so described hereinafter. Generally, the transmission comprises an automatic clutch and gearing, for transmitting the power from the engine of the automotive vehicle to the propeller shaft, and control means for governing the clutch and the gearing to determine the direction and speed of movement of the vehicle for a given engine operation. In accordance with conventional practice, the transmission provides three speeds in a forward direction and a single speed in reverse. Herein, however, the transmission and the controls thereof are so designed that the selection of the direction of movement is made manually, while the selection of the rate or speed of movement, that is, change in the ratio of the gearing, is made automatically, but with the time of change as well as initiation of movement of the vehicle under the control of the operator of the vehicle in which the transmission is incorporated. This control, moreover, is effected through the accelerator pedal so as to be of maximum convenience to the operator. Superimposed upon the automatic speed or gear ratio control is a manual control for effecting a back to second shift, normally utilized for rapid acceleration or deceleration purposes. Manual control of the automatic clutch through the conventional clutch pedal is also provided for producing a condition in the transmission permitting the engine to serve as a brake when the vehicle is parked on an incline and for permitting the engine to be started by pushing the vehicle.

Referring to Fig. 1, there is disclosed therein a transmission generally designated A associated with an internal combustion engine generally designated B, of an automotive vehicle. The transmission comprises generally (see Fig. 3) a drive shaft D', a driven shaft $D^2$, an automatic clutch C, and gearing G. The clutch C has parts equivalent to the conventional driving and driven parts of a clutch, with means, including centrifugal weights, for effecting engagement of the parts. Operatively and, to a certain extent, structurally interposed between the driven part of the clutch and the driven shaft $D^2$ is the gearing G connectable in various gear trains to produce the different ratios between the driven part of the clutch and the driven shaft $D^2$ for obtaining forward or reverse movement, and low, intermediate, or high gear. This gearing comprises a direction selector gear 21 shiftable to forward, neutral or reverse position, a high speed or gear clutch 22 for directly coupling the driven part of the clutch to the driven shaft $D^2$, an intermediate speed gear train which includes an intermediate speed clutch generally designated 23 and an overrunning clutch generally designated 24, a low speed gear train which includes an overrunning clutch generally designated 25 and the direction selector gear 21, and an intermediate speed lock-up clutch generally designated 26 for locking out the overrunning clutch 24.

As previously stated, the control means of the transmission is both manually and automatically actuated. The manual control (see Figs. 1 and 2) comprises means for actuating the automatic clutch including a conventional clutch pedal 27 which may be depressed in the conventional manner to disengage the clutch, and means for shifting the selector gear 21 including a handle 28 grasped by the hand of the operator of the vehicle and manipulated to shift the selector gear to neutral, forward or reverse in much the same manner that the present gear shift lever is manipulated to shift a conventional transmission to neutral, low or reverse. The automatic control of the transmission comprises gear ratio selector means generally designated 29 (see Fig. 2) for effecting engagement of the high and intermediate speed clutches but with the time of engagement under the control of the operator of the vehicle through the accelerator pedal 30. The gear ratio selector means is itself controlled by a neutral and reverse lock out cam 31 (Figs. 1 and 2) associated with the direction selector means for preventing engagement of the high or intermediate speed clutches when the selector gear 21 is in neutral or reverse position, and by a master cam generally designated MC which is under the control of the automatic clutch. Superimposed upon the automatic gear ratio selector control means is an intermediate speed lock-up means including an intermediate speed lock-up pedal 32 which is depressed to obtain a shift from high to intermediate for purposes of rapid acceleration or deceleration of the vehicle. Means including a device 33 responsive to engine operation, which device also is partly under the control of the clutch pedal 27, is also provided for maintaining the clutch in its automatic position while the engine is running and for locking the transmission in gear, when the engine is dead, for parking the vehicle on an incline.

For a more ready understanding of the subsequent detailed description of the construction of the transmission, above generally outlined, the operation of the transmission is briefly related. Let it be assumed that the engine of the vehicle is dead and that the direction selector gear 21 is in neutral position. To start the vehicle, the operator depresses the clutch pedal 27, then starts the engine and permits the same to run at idling speed. While so running, the clutch pedal 27 may be released without danger of forward movement of the vehicle, for the automatic clutch is disengaged during idling speeds of the engine and the clutch, moreover, is held out of its manually engaged position by the means responsive to engine operation, just previously mentioned. The operator next grasps the handle 28 and pushes the same inwardly (i. e. forward) to shift the selector gear 21 to forward position. After having so shifted the selector gear, the transmission is now in condition to impart a forward movement to the vehicle at low speed, and such forward movement may be obtained simply by depressing the accelerator pedal 30 to increase the speed of the engine. With such increase in speed of the engine, the automatic clutch becomes engaged and the vehicle is driven forward in low gear.

At any time when the operator of the vehicle believes that it has attained sufficient momentum, he may shift from low to intermediate simply by momentarily letting up on the accelerator pedal 30 to decelerate the engine until the speed thereof is synchronized with the speed of the driven shaft $D^2$ at the new gear ratio. When synchronism is reached the intermediate gear clutch 23 engages and the transmission is then in intermediate gear. Again, the operator of the vehicle may remain in intermediate gear any length of time that he desires, and upon letting up on the accelerator pedal, the shift from intermediate to high is effected in the same manner as above stated. Should the operator, while the transmission is in high gear, desire to place the transmission in second or intermediate gear, either to accelerate more rapidly or to brake the vehicle by means of the engine, he may do so by depressing the pedal 32 and maintaining the same depressed during the acceleration or deceleration period. When the vehicle is brought to rest, such as for a stop light, and the engine permitted to idle, the transmission will automatically return to low gear and the same procedure is followed for again getting into high gear as above outlined. At any time, the main clutch C may be disengaged and the transmission returned to a low gear by a full depression of the clutch pedal 27. When the vehicle is brought to rest, and the engine stopped, the intermediate and high speed clutches will automatically disengage and the transmission may be placed in neutral by pulling the handle 28 outwardly to its intermediate position. Should the operator desire to lock the vehicle in gear to aid in preventing the same from moving when parked on an incline, this is readily done by shifting the selector gear 21 to reverse position by means of the handle 28 and momentarily depressing the clutch pedal 27 a short distance whereby the automatic clutch is released and permitted to engage positively.

*Automatic clutch*

Referring now particularly to Figs. 1 to 3 and 11 to 13, the clutch C is encased in a housing 40 secured to one end of the engine block and composed of top and side walls. The bottom of the housing is closed by a pan 41 removably secured to the housing to facilitate inspection of the clutch.

The driving part of the clutch C comprises (Fig. 3) a main driving plate 42 secured by means of bolts 43 to the flanged end of the driving shaft D', a spring plate 44, a spring cover 45 and a pressure plate 46, all supported to revolve as a unit with the main plate 42. The driven part of the clutch on the other hand comprises simply a plurality of annular friction disks 47, interposed between the main plate 42 and the pressure plate 46, and secured to a plate 47' which is carried on a hub 48 mounted on the splined end of a shaft 49. At its splined end the shaft 49 has a reduced portion 50 which is received and journaled in a socket 51 formed in the end of the shaft D', while at its opposite end the shaft 49 is journaled by means of ball bearings 52 in the end wall 53 of a housing 54 for the gearing G. The shaft 49 may be considered as an element of the driven part of the clutch C or may be considered as an intermediate shaft.

Referring back to the driving part of the clutch, the main plate 42 is formed at its periphery with an annular flange 56 of considerable thickness extending in a direction away from the shaft D' so as to provide in the inner or rear face of the plate a circular recess 57 within which the disks 47 are disposed. Also disposed within the recess 57 is the pressure plate 46. This plate is annular and comparatively thick to withstand the strain which is placed upon it. Riveted or welded to the pressure plate 46 at 58' is a disk 58 having centrally thereof a laterally extending flange 59 forming a hub loosely encircling the shaft 49.

Secured by means of bolts 61 to the radial face of the flange 56 is the spring cover 45 formed with an annular series of pockets 63 on the inside thereof, and a plurality of equally spaced apertures 64 the purpose of which will shortly be made apparent. Herein these apertures 64 are three in number and rectangular. The spring plate 44 also is annular and, in order that it may be supported to rotate with the main plate 42 and yet have an axial shifting or floating movement with respect thereto while remaining concentric with the shaft 49, it is formed with three equally spaced rearwardly projecting brackets 66. Each of the brackets 66 has flat parallel sides and extends partially through one of the apertures 64 with a sliding fit. It will be apparent that, because there are three apertures 64 equally spaced, the spring plate 44 may slide axially relative to the cover 45 but in any axial position will be maintained concentric of the shaft 49 by the apertures 64 and brackets 66. In addition to guiding and centering the plate 44, the apertures and brackets serve to transmit the rotation of the main plate 42 to the spring plate. In order to rotate the pressure plate 46 and to maintain the same concentric with the shaft 49, the spring plate 44 (Figs. 11 and 13) is formed with three equallly spaced notches 67, while the pressure plate 46 is formed with correspondingly spaced lugs 68 received in the notches 67 with a sliding fit. Moreover, plate 44 has an annular series of apertures 70 near its periphery and extending slidably through each of three such apertures is a bolt 71 threaded into the pressure plate 46 for aiding in supporting the pressure plate from the spring plate. In the present instance, the bolts 71 and apertures 70 are shown immediately clockwise of the brackets 66, as viewed in Fig. 11. Preferably, the bolts 71 are secured by a lock nut 72 and interposed between the head of each bolt and the spring plate is a light compression spring 73. Interposed between the spring plate 44 and the cover 45 is an annular series of clutch springs 74, each received at one end in the socket 63 and at the other end received in a shallow socket formed in the rear face of the spring plate by strengthening ribs 75 and an annular rib 75' encircling aperture 70. These springs act in a direction and function at all times to urge the spring plate and the pressure plate in a direction to effect engagement of the clutch.

As previously stated, the clutch C is automatic in operation, and, accordingly, means is provided for causing engagement of the clutch when the rotative speed of the driving part of the clutch reaches a certain value. Herein this comprises a plurality of centrifugal weights 76 (Figs. 3, 11 and 12) adapted to be positioned between the spring plate 44 and the pressure plate 46 in space provided by an annular, laterally extending flange 77 on the spring plate 44. In the present instance three such weights are employed, each being generally triangular in shape and each pivotally mounted at one corner on one of three equally spaced studs 78 welded at one end at 58' (Fig. 3) to the disk 58 which is in turn riveted to the pressure plate 46. At their other ends the studs 78 project through and are supported by a triangular plate 79 received over the flange 59 forming the hub of the pressure plate. Mounted over the projecting end of each stud 78 is a spool 80 retained by a nut 81. Wound about each spool is a spring 82 having one end hooked about a pin 83 carried by the plate 79 and the other end engaging a pin 84 on a weight 76 urging the weight inwardly toward the shaft 49.

To equalize the movements of the weights 76, each is connected by means of a link 87 to an equalizer plate 88 freely rotatable upon the hub 59 of the pressure plate 46. To accommodate the links 87, each weight 76 is formed with a semicircular recess 89 in which one end of a link 87 is received and pivotally attached by means of a pin 90. The other end of each link 87 is pivotally connected to the equalizer plate by a pin 91.

When the clutch is not rotating the weights 76 are held inwardly by the springs 82 and assume the solid line position shown in Fig. 12, which may be termed an inoperative position. The weights are also retained in substantially this same position even when the clutch is rotating at speeds comparable to normal idling speeds of the engine B. However, when the speed of the engine B is raised above normal idling speeds, the centrifugal force created overcomes the springs 82 and causes the weights 76 to be swung outwardly about the studs 78 to the dotted line position of one of the weights, shown in Fig. 12. In order that the weights may assume this position, the outer edge of each weight is curved to conform with the radius of the flange 77 so that the weight may lie flush against the flange and engage the same throughout the entire length of the edge of the weight. While the edge of the weight 76 is curved to conform with the radius of the flange 77, it can readily be seen from the dotted line position of the weight in Fig. 12 that, even when the weight is in its extreme outward position, it still lies on that side of a line through the center line of the shaft 49 and the center line of the stud 78 on which it lies when in its inner or inoperative position, so that it is free to return to its inoperative position whenever the rotative speed of the clutch drops sufficiently.

To eliminate any noise which might result from a sudden engagement of the weights with the flange 77 when the clutch reaches a rotative speed at which the weights fly outwardly to engage the clutch, each weight is provided with a yieldable means so positioned that it contacts the flange 77 before the weight proper contacts the flange, and thereby cushions the impact. To that end, each weight is formed at the corner adjacent the flange 77 with a recess 94 (Fig. 12) opening through the curved edge thereof. Pivotally mounted in this recess on a pin 95 is a triangular block 96. The pin 95 passes through one acute corner of the block and is so positioned that that corner of the block never protrudes from the recess 94. Engaging the other acute corner of the block 96 is a plunger 97 urged outwardly by a compression spring 98 and in turn causing the third corner of the block 96 to protrude from the recess 94. The extent of protrusion of the block 96 is limited by a pin 99 which passes through an aperture 100 in the block which is larger than the pin so that the block may be forced inwardly to lie wholly within the recess 94. It will be apparent from the foregoing that as the weights 76 are swung outwardly the protruding corner of the block 96 will engage the flange 77 before the weight 76 engages the flange and will cushion contact of the weight with the flange. Preferably the point of contact of the protruding corners of the blocks do not lie counter-clockwise (as viewed in Fig. 12) of a line through the axis of the clutch and the hub of the respective weight, so that the springs 98 need not act as release springs. However, by varying the point of contact these devices may be used as a means for delaying or speeding up the disengagement of the clutch as the speed thereof decreases.

The movement of the weights under centrifugal force is imparted to the pressure plate 46 to effect engagement of the clutch by toggle means, one for each weight, acting between the spring plate 44 and the pressure plate 46. Each of these toggle means comprises an arm 105 disposed in the space between the spring plate and the pressure plate and pivotally mounted at one end on a stud 106, one end of which is fixed in the pressure plate 46 and the other end of which is slidably supported in the spring plate 44 intermediate the bracket 66 and an adjacent stud 71. The arm 105 is formed intermediate its ends with a generally conical socket 107 opening toward the spring plate 44, and formed in the adjacent face of the spring plate is a complementary conical socket 108 (Fig. 3). These sockets are positioned substantially in the same diametrical plane, but with the socket 108 in the spring plate slightly outwardly of the socket 107 in the arm 105 when the latter is in its inoperative or inner position. Interposed between the sockets is a strut 109 which is rounded at both ends to provide freedom of movement when the arm 105 is pivoted relative to the spring plate and yet serve to separate the arm from the spring plate to force the pressure plate 46 into engagement with the disks 47. Each of the arms 105 is swung by means of a link 110 pivotally connected at one end by means of a pin 111 between ears on the arm 105 and at the other end by means of a pin 112 to the equalizer plate 88.

Radially inwardly of each of the brackets 66 the spring plate 44 is formed with a hole 115 (see Fig. 3) in which is slidably received one end of a bar 116, the other end of which projects through the cover 45 and carries a large nut 117 preventing the bar from being drawn through the cover in a direction toward the spring plate 44. Extending transversely of the bar 116 is a pin 118 upon which is journaled a finger 119 extending both radially inwardly to a point adjacent the shaft 49 and also radially outwardly for a short distance from the pin 118. At the point of engagement with the pin 118 the finger 119 has a slot 120 through which the bar 116 projects and is curved to provide a journal for the pin 118. Above the slot 120 the finger is reversely bent to provide a groove in which one edge of a plate 122 bears. The other edge of the plate 122 bears against the depending portion of the bracket 66 and is held on the bracket by means of lugs which are received in grooves 123 formed on opposite sides of the bracket. In order further to aid in retaining the finger 119 in position, the extreme upper end is bifurcated and projects on either side of the bracket 66.

Slidably mounted upon a sleeve 125, encircling the shaft and supported from the housing 40, is a ball bearing collar 126, one face of which is adapted to engage the inner ends of the fingers 119. This collar is normally urged to a withdrawn position by means of a tension spring 127 anchored at one end to a pin 128 in the housing 40 and at the other end to the collar 126 and may be urged forwardly, that is, to the left as viewed in Fig. 3, to engage and shift the fingers 119 by means of a yoke 129 fixed on a shaft 130 extending transversely of the housing 40. The manner of actuating the yoke 129 will be described hereinafter. As shown in Fig. 3, the clutch is in its automatic idle position, indicated as AI. When the engine is caused to operate above idling speed, the centrifugal weights 76 move outwardly, thereby rotating the equalizer plate 88 which through the links 110 transmits its rotation to the arms 105, causing them to swing radially outwardly. As a result the struts 109 are caused to assume a more nearly horizontal position, tending to separate the spring plate and the arms 105 and thereby causing the pressure plate to engage the disks 47, the actual force applied to the clutch being that represented by the plurality of very strong springs 74. As an incident to such action by the centrifugal means, the spring plate 44 is shifted slightly to the right, as viewed in Fig. 3, and the fingers 119 are correspondingly pivoted to assume what may be termed automatic engaged position of the clutch, which is represented by a dotted line position of the collar 126, referred to as AE. When the collar is forced to the left, to the dotted line position referred to as M, the springs 74 are compressed to such an extent and the spring plate 44 shifted to such an extent that the clutch is disengaged regardless of whether the centrifugal weights are in their operative or their inoperative position. This will hereinafter be referred to as the manually disenegaged position of the clutch. The clutch has still a fourth position, represented by the dotted line position referred to as ME, which will hereinafter be called the manually engaged position in which the clutch is positively engaged when the engine is dead.

In Figs. 3a and 3b there is disclosed a modified construction of the clutch C. As disclosed in those figures, a main driving plate 42′, in addition to carrying a spring cover 45′, a spring plate 44′, and a pressure plate 46′, carries an auxiliary pressure plate 46″. This plate is supported by means of three equally spaced bolts 130′ non-rotatably secured at their inner ends in the auxiliary plate 46″ and at their outer ends slidably guided in a bracket 131′ secured to the main driving plate 42′. Intermediate its ends each bolt is provided with a thread of very large pitch, and engaging the threads is a nut 132′ having its head disposed between the bracket 131′ and the plate 42′ and having a reduced tubular extension projecting rotatably into the plate 42′. Because of the large pitch of the threads, slight rotation of the nut 132′ serves to impart a substantial longitudinal movement to the bolts, and a corresponding movement to the auxiliary pressure plate 46″. Thus rotation of the nuts 132′ serves to space the auxiliary plate 46″ away from the main plate 42′, as shown in Fig. 3a, or to shift the auxiliary plate toward the main plate 42′.

The shift of the auxiliary pressure plate 46″ is automatic in response to the rotation of the plate 42′. In the present instance there is secured to each of the nuts 132′ a centrifugal weight 133′ (see Fig. 3b) which is urged inwardly by a tension spring 134′ anchored at one end to the centrifugal weight and at the other end to the plate 42′. The weights and the springs are so constructed and proportioned that the weights will assume their inner or inoperative position when the plate 42' is not rotating, and in this position the auxiliary plate 46'' is shifted away from the main plate 42'. Upon rotation of the plate 42', the weights are pivoted outwardly to the dotted line position shown in Fig. 3b, with the result that the auxiliary pressure plate 46'' is shifted toward the main plate 42'.

In the modified form shown in Figs. 3a and 3b, the toggle mechanism, functioning to separate the pressure plate and the spring plate for the purpose of effecting engagement of the clutch, it is also modified. In the modified form the spring plate 44', as distinguished from the pressure plate 46', has a central annular flange 59' for supporting an equalizer plate 88' for the centrifugal weights. The centrifugal weights (not shown in Figs. 3a and 3b) are identical with those disclosed in Figs. 3, 11 and 12, and are connected to the equalizer plate in the same manner as previously described. The equalizer plate in turn is connected to each arm 105' of the toggle mechanism by means of a link 110'. The arm 105' instead of having a conical socket opening toward the spring plate 44' is formed with a shallow spherical socket 107' opening toward the pressure plate 46'. Disposed opposite the socket 107' is a socket 108', of the same configuration as the socket 107', formed in the adjacent face of the pressure plate 46'. Interposed between the sockets is a strut 109' which herein takes the form of a cylindrical ball smaller in radius than the curvature of the sockets 107' and 108'.

The construction of the toggle mechanism is advantageous in that, in combination with the movement imparted to the arm 105' by the linkage connecting the arm with the centrifugal weights, a substantially uniform rate of separation of the pressure plate and the spring plate are obtained. From a consideration of Fig. 12, it will be apparent that the linkage connecting a centrifugal weight to an arm 105, which linkage also constitutes a toggle mechanism, during movement of the weight from its inoperative to its operative position, transmits an initially large and then a successively decreasing movement to the arm 105. On the contrary, the toggle mechanism formed by the arm 105' and the ball 109', because of the character of the sockets 107' and 108', imparts an initially small separating movement to the arm and the pressure plate 46', and thereafter an increasingly greater movement. Thus it will be seen that the initially large movement and the decreasingly smaller movement imparted to the arm 105' by the linkage connecting it to a centrifugal weight is compensated for by the initially small and increasingly large movement imparted by the toggle mechanism between the arm and the pressure plate. The result is, as previously stated, a substantially uniform separation movement with a corresponding substantially uniform application of force.

Interposed between the pressure plate 46' and the auxiliary pressure plate 46'' are friction disks 47' carried on a hub 48' fixed on the splined end of the shaft 49. The construction of the means for controlling the position of the spring plate 44' is the same as that disclosed in Figs. 3, 11 and 12.

As a result of two sets of centrifugal weights and of the mounting of the auxiliary pressure plate 46'', the clutch has a unique operation, automatically assuring engagement of the clutch when not rotating so that there will always be a connection from the engine to the gearing of the transmission whenever the engine is dead. More specifically, the clutch is engaged when the engine is dead, that is, the clutch is not rotating, because both sets of centrifugal weights are then in inoperative position, with the result that the auxiliary pressure plate 46'' is shifted away from the plate 42' causing the disks 47' to be gripped between the pressure plates. Upon starting of the engine and while rotating at idling speed, the weights 133' are swung to operative position, thereby retracting the auxiliary pressure plate 46'' while the main centrifugal weights are still in inoperative position, with the result that the clutch is disengaged. Upon acceleration of the engine above idling speed, the main centrifugal weights are shifted to their operative position, thereby causing the pressure plate 46' to be shifted and again causing the disks 47' to be engaged.

While the engagement of the main centrifugal weights 73 with the flange 77 in the outward movement of the weights is silenced by the blocks 96 and the springs 98, the return of the weights 76 to their inward position under the influence of the main clutch springs 74 is cushioned by means of a suitable hydraulic dashpot 101 (see Fig. 5) of conventional construction. The piston of the dashpot is connected to an arm 102 fixed on an end of the shaft 130 projecting from the right side of the transmission and the casing or cylinder of the dashpot is mounted on the gearing housing 54.

*Gearing*

As previously generally stated, there is interposed between the driven part of the clutch C, herein the intermediate shaft 49, and the driven shaft $D^2$ gearing shiftable to determine the direction of rotation of the driven shaft $D^2$ and the gear ratio between the engine and the driven shaft to determine the direction and speed of movement of the vehicle, with which the transmission is associated, for a given engine operation. Herein the driven shaft $D^2$ is in axial alinement with the shaft 49 and at its forward end has a reduced portion 135 journaled in roller bearings 136 disposed in a recess 137 formed in the rear end of the shaft 49, which end is enlarged for that purpose. The other end of the driven shaft $D^2$ is journaled in ball bearings 138 retained in the rear wall of the gearing housing 54. Secured to the end of the shaft projecting through the rear wall of the housing is one element 139 of the universal joint. Intermediate its ends the shaft $D^2$ is provided with a section of spiral splines 140 and a section of parallel splines 141.

Disposed parallel and vertically below the driven shaft $D^2$ is a counter shaft 144 fixedly mounted at its ends in the front and rear walls of the gearing housing 54. Rotatable upon the shaft 144 and extending the entire length thereof is a counter shaft sleeve 145. At its forward end the sleeve 145 is formed with a radial flange 146 to which is riveted a gear 147 constantly in mesh with a gear 148 formed on the enlarged end of the shaft 49. Keyed to the other end of the sleeve 145 is a gear 149 constantly in mesh with an idler or reversing gear 150 journaled on a stub shaft mounted behind and slightly above the shaft 144 as viewed in Fig. 3.

The transmission, as previously stated, provides three speeds in a forward direction and a single speed in a reverse direction, with the selection of direction made through the means of the selector gear 21. This gear is formed with internal splines so as to be nonrotatably but slidably mounted on the driven shaft $D^2$, more particularly on the portion having the spiral splines 140. In Fig. 3 the gear 21 is shown in its neutral position in which it is out of mesh with all gearing. It may be shifted rearwardly along the shaft $D^2$ into engagement with the gear 150 whereby the transmission is connected to drive the vehicle in reverse direction, the drive train under those conditions including the clutch C, gear 148, gear 147, counter shaft sleeve 145 and gears 149, 150 and the selector gear 21. The gear 21 and the idler gear 150 are herein formed with spiral teeth to obtain quietness in operation, the spiral splines 140, as is well known in the art, serving to maintain the gears in mesh during operation.

When the selector gear 21 is shifted forwardly from its neutral position the transmission is placed in low gear. The low gear train includes in addition to the selector gear 21 the overrunning clutch 25. Herein the overrunning clutch comprises an outer housing member 155 which is keyed to the countershaft sleeve 145 intermediate the gear 147 and the gear 149 so as to rotate therewith. This member has an annular flange 156 providing a smooth inner cylindrical surface. Rolling in contact with this inner cylindrical surface are a plurality of rollers 157 retained in equally spaced positions by a spacing and retaining ring 158. Freely rotatable on the countershaft sleeve 145 intermediate the member 155 and the gear 149 is an elongated sleeve 159. The forward half of this sleeve constitutes the complementary member of the overrunning clutch 25 and to that end extends into the housing member 155 and is formed with conventional cam surfaces shaped to cause a binding of the rollers 157 between the member 159 and the member 155 when the latter attempts to overrun the sleeve 159 in one direction, thereby causing the sleeve and the member 159 to rotate in unison but permitting the sleeve 159 to overrun the member 155 in that same direction. In the present instance the overrunning clutch is so arranged that it is engaged when the driving torque is from the engine through the clutch to the driven shaft $D^2$, but is disengaged when the torque is in the reverse direction, that is, when the momentum of the vehicle is driving the driven shaft $D^2$. The precise formation of the cam surfaces on the forward end of the sleeve 159 can be seen in Fig. 8 which shows the overrunning clutch 24, which is the same construction as the clutch 25. The rear half of the sleeve 159 is formed with spiral teeth 160 with which the selector gear 21 meshes when shifted forward so as to complete the low speed gear train.

The intermediate or second speed gear train includes, as previously stated, the overrunning clutch 24 and the intermediate speed clutch 23. To form the overrunning clutch 24, the gear 147 is provided with an annular, longitudinally extending flange 163 having a smooth inner cylindrical surface. Adapted to roll on this surface are a plurality of rollers 164 maintained uniformly separated by means of a spacing and retaining ring 165. Cooperating with the rollers 164 is a cam element 166 freely rotatable upon the sleeve 145. This cam element, as best seen in Fig. 8, is formed on its periphery with a plurality of cam surfaces cooperating with the rollers 164 to prevent the gear 147 from overrunning the element 166 in one directions of rotation by wedging the rollers 164, but permitting the element 166 to overrun the gear 147 in that same direction of rotation. Herein, as viewed in Fig. 8, the clutch becomes engaged when the gear 147 has a tendency to rotate faster than the element 166 in a clockwise direction, while the clutch is disengaged when the element 166 tends to rotate faster in a clockwise direction than the gear 147.

Freely rotatable on the countershaft sleeve 145 intermediate the cam element 166 and the member 155 is a sleeve 168 which at its forward end is constantly connected with the cam element 166 by means of cooperating lugs and notches. At its other end the sleeve carries a gear 169 constantly meshing with a gear 170 freely rotatable on the driven shaft $D^2$. This gear is adapted to be connected to rotate with the driven shaft $D^2$ through the intermediate speed clutch 23. Herein the intermediate speed clutch is a jaw clutch of the overrunning type. Accordingly, one face of the gear 170 is formed with jaw teeth 171. Adapted to cooperate with the teeth 171 are teeth 172 formed on an annular clutch element 173 splined to an annular ring 174, fixed on the shaft $D^2$, for nonrotational but relative longitudinal movement. It will be apparent from the foregoing that the intermediate speed gear train includes the clutch C, gear 148 on the enlarged end of the shaft 49, gear 147, overrunning clutch 24, sleeve 168, gears 169 and 170, and the jaw clutch 23. The gear 169 is larger than the gear 160, while the gear 170 is smaller than the selector gear 21 so that the ratio between the engine and the driven shaft $D^2$ is lower when the intermediate clutch 23 is engaged. It will be apparent from the foregoing that the transmission will be in intermediate gear when the clutch 23 is engaged and that it is not necessary that the selector gear 21 and the gear 160 be disengaged. This is taken care of by the provision of the overrunning clutch 25 in the low speed gear train which permits the sleeve 159 to overrun the member 155.

Means is provided in the form of the intermediate speed lock-up clutch 26 for rendering the overrunning clutch 24 ineffective and thereby providing a positive connection between the vehicle and the engine when in second gear. To that end the flange 163 is formed with internal clutch teeth 176 and adapted to cooperate with these teeth are teeth 177 formed on the periphery of an annular clutch collar 178 keyed to the sleeve 168 so as to be rotatable therewith and at the same time shiftable into or out of engagement with the teeth 176. It is believed apparent that when the teeth 176 and 177 are engaged there will be a positive connection between the sleeve 168 and the gear 147, cutting out or locking out the overrunning clutch. As best seen in Figs. 6 and 10, the ends of the teeth 176 and 177 are beveled with the leading edge of the teeth 177 given an even sharper bevel to facilitate engagement of the teeth, as will become more apparent hereinafter.

For high gear the driven shaft $D^2$ is connected with the clutch C to rotate in a 1:1 ratio therewith. This is effected by means of the high speed clutch 22 which is a jaw clutch and comprises jaw teeth 180 formed on the end of the shaft 49 and cooperating jaw teeth 181 formed on a clutch collar 182 internally splined and cooperating with the splines 141 on the shaft $D^2$ so as to rotate therewith but being shiftable axially relative thereto. As best seen in Figs. 6, 8 and 9, the ends of the teeth 180 and 181 are beveled with the trailing edge of the teeth 181 provided with even a sharper bevel 181'. The clutch 22 is disengaged when the transmission is in low or intermediate gear and is engaged to place the transmission in high gear. When so engaged the driven shaft D² is directly connected to the shaft 49. This engagement of the clutch 22 may be effected without disengaging the selector gear 21 and the gear 160 in the low gear train, and without disengaging the clutch 23 in the intermediate gear train, because of the presence of the overrunning clutches 25 and 24, respectively, in those trains.

In order that the operation of the jaw clutches may be more readily understood, the operation of the clutch 22 will be described in some detail. Though the remaining jaw clutches may vary somewhat in detailed construction, the principle of operation is the same as that of the clutch 22, so that the description of the operation of that clutch will suffice. Except when prohibited by some positive means, the clutch collar 182 is yieldably urged to effect engagement of the clutch. Under normal operating conditions, such engagement of the clutch is prevented even though the ends of the teeth 180 and 181 are in engagement, because the teeth 180 are rotating faster than the teeth 181 with the result that the collar 182 is cammed away by the beveled faces of the teeth. Should the gear 148 carrying the clutch teeth 180 be reduced in speed relative to the collar 182 until it is approximately in synchronism with the collar 182 or rotating just a fraction below synchronous speed, the teeth will mesh and the clutch become engaged.

The housing 54 is preferably provided with a cover 184 removably secured by nuts 185. In its bottom wall, the housing 54 preferably is provided with a drain plug 186 and it is to be understood, of course, that suitable washers, retaining rings or bushings are interposed between various gear or clutch elements or between the elements and a shaft to maintain the same out of contact or to maintain the same in position on the shaft or the sleeve upon which they are mounted. These washers, rings or bushings have not been described specifically because they normally are of conventional construction and are commonly employed by those skilled in the art. An exception is ring 187 interposed between gear 170 and clutch element 182. This ring is internally splined to mesh with and slide over the splines 141 into the annular groove therein (see Fig. 3). Once in the groove, the ring is rotated slightly enabling a spring pressed plunger 187' to engage a notch and secure the ring. Preferably, the counter shaft sleeve 145 is mounted at its ends on pin bearings 188 and 189.

Control

The normally operable control means of the transmission is automatic and this means functions except in special instances where it is desirable for the operator to modify the normal operation by certain manual control means. Among the manual control means is that for the clutch C which includes the clutch pedal 27 conventionally mounted to the left of the steering column of the vehicle to be operated in the usual manner by the left foot of the operator of the vehicle. The clutch pedal 27 is suitably bent to extend downwardly and rearwardly beneath the foot boards 190 (see Figs. 1 and 2) of the vehicle and at its lower end terminates in a hub 27' journaled on a stub shaft 191 projecting inwardly from the frame 192 of the vehicle. Rigid with the hub 27' is a short arm 193 which is connected by a link 194 with the end of an arm 195 formed integral with a tubular shaft 196 disposed in axial alinement with the clutch throwout shaft 130. This hollow shaft 196 is journaled at its outer end on a stud 197 supported on a bracket 198 secured to the frame 192. At its inner end the shaft 196 is journaled for free rotative movement on the end 130', of the shaft 130, extending outwardly of the housing 40.

Fixedly mounted, as by a set screw 199', on the projecting end 130' of the shaft intermediate the shaft 196 and the housing 40 is a multi-armed member 199 (see Figs. 1, 2, 4 and 5) having an arm 200 extending laterally to overlie a portion of the shaft 196. This arm has threaded therein to permit adjustment thereof a bolt 201 disposed in the path of a finger 202 rigid with the hollow shaft 196. It will be apparent from the foregoing description that, with this construction, depression of the pedal 27 rocks the hollow shaft 196 thereby causing the finger 202 to engage the bolt 201 and through the member 199, shaft 130 with which it is fixed, and yoke 129, the collar 126 is shifted forwardly and with a sufficient depression of the clutch pedal 27 may be shifted to the manual disengaged position M in which the spring plate 44 is retracted to such an extent by the fingers 119 that the clutch is disengaged under all conditions.

Also among the manual control means is the means for controlling the position of the direction selector gear 21. This means, as previously stated, includes the handle 28 which, as best seen in Figs. 1 and 2, is positioned just to the right of the steering column and may be supported by a bracket 204 depending from the instrument panel 205. In the present instance the direction selector gear 21 is shifted to its various positions by means of a yoke 206 (see Figs. 4 to 6) the ends of which are received in an annular groove 207 formed in the gear 21 for that purpose. The yoke 206 is formed with an elongated hub 208 freely slidable upon a rod 209 extending longitudinally of the gearing housing 54 at the left side thereof, as viewed in Fig. 2. The hub 208 in turn is formed with a bifurcation 210 (see Fig. 6 in particular) in which is received the rounded end of an arm 211 (see Figs. 4 and 6) fixed at its upper end to the inner end of a shaft 212 extending through and journaled in the left side wall of the housing 54 as viewed in Fig. 2. Preferably the housing wall is provided with a laterally projecting hollow stud 213 which provides a sufficiently wide journal for the shaft 212 to prevent the same from tilting. Fixed to the outer end of the shaft 212 is an arm 214 to the lower end of which is connected one end of a flexible yet rigid cable 215. The other end of the cable 215 is connected (Fig. 1) to one arm of a crank 216 pivoted on a bracket 217 secured to the foot boards 190. Secured to the other arm of the crank 216 is the handle 28. Preferably the cable 215 is encased throughout the major portion of its length in a sheath 218 rigidly secured at its ends to the bracket 217 and to the housing 54 so as to strengthen the cable 215 and enable it to withstand a compression as well as a tension stress. In the drawings the gear 21 and the handle 28 are shown in neutral position. By pushing in on the handle 28, that is, forward, the arm 214 will be rocked clockwise, as viewed in Fig. 1, with the result that the gear 21 is shifted from its neutral position into mesh with the gear 160 of the low gear train. By pulling out or rearwardly on the handle 28, the arm 214 is swung in a counter-clockwise direction, as viewed in Fig. 1, with the result that the gear 21 is shifted to the right, as viewed in Fig. 3, into mesh with the gear 150 thereby placing the transmission in reverse gear. It will be apparent from the foregoing that the manipulation of the direction selector means is quite similar to that of a standard manual shift transmission. Notches are preferably formed in the handle 28 which are engaged by a spring-pressed plunger 219 for yieldably retaining the handle in either neutral, forward or reverse position.

Among the automatic control means is that for changing the gear ratios of the transmission to obtain different speeds. This control, as previously described, is completely automatic but the time of change is under the control of the operator through the accelerator pedal 30. More particularly, this control relates to the engagement of the high and intermediate speed jaw clutches 22 and 23.

Accordingly, each of the clutches 22 and 23 is provided with a yoke 222 and 223, respectively. The yoke 222 is rotatably mounted upon a shaft 224 extending transversely of the housing 54 above the shaft D² with the free ends of the yoke engaging a groove 225 formed in the clutch element 182 for that purpose. Likewise, yoke 223 is rotatably mounted upon a shaft 226 extending transversely of the housing 54 above the shaft D² with the free ends of the yoke engaging a groove 227 formed in the clutch element 173 for that purpose. The yokes 222 and 223 are provided with an arm 228 and 229, respectively, extending laterally, as best seen in Figs. 2 and 5.

In order that the clutch elements 182 and 173 may be yieldably urged toward engaged position, the shaft 224 projects outwardly through the left wall of the housing 54, as viewed in Fig. 2, and has rigidly fixed on its projecting end a hub 230. Encircling the hub is a coiled spring 231, one end of which bears against a lug formed on the housing 54 and the other end of which is hooked about a radial pin 232 rigid with the hub 230. The spring 231 is so arranged that it tends to rotate the shaft 224 in a clockwise direction, as viewed in Fig. 3. In order that this rotative tendency of the shaft 224 may be yieldably applied to the yokes 222 and 223 for urging the respective clutch elements toward engaged position, there is non-rotatably secured to the right end of the shaft 224 an arm 233 (see Figs. 2 and 7). The free end of the arm 233 is formed with a slightly elongated slot 234 in which is pivotally connected one end of a rod 235 extending loosely through suitable apertures formed in the arms 228 and 229. Pinned to the free end of the rod 235 is a socket washer 236, and pinned to the rod intermediate its ends and just to the left of the arm 229, as viewed in Fig. 7, is a similar washer 237. Slidably encircling the rod 235 are two guide washers 238, one located to the right of and in contact with each of the arms 228 and 229. Interposed between the pinned washers 236 and 237 and each of the guide washers 238 is a compression spring 239. It will be apparent that, with this construction, when the shaft 224 is rocked in a clockwise direction, as viewed in Fig. 7, under the influence of the spring 231 the yokes 222 and 223 and hence the clutch elements 182 and 173 are merely yieldably urged toward engaged position permitting the clutches to overrun without damage, as previously described. The mechanism just described thus constitutes what might be termed a cocking mechanism for the high and intermediate speed clutches. However, when the shaft 224 is rocked in a counter-clockwise direction, as viewed in Fig. 7, the yokes are positively urged in a direction to disengage the clutches.

While control of the final engagement of the clutches 22 and 23, once they are permitted to be yieldably urged toward engaged position by the spring 231, is through the accelerator pedal 30, there is superimposed upon that control a control partially by the manual direction selector control and partially by the automatic clutch C which determines the conditions or times under which the shiftable clutch elements are free to be urged toward engaged position by the spring 231. Such superimposed control means includes the neutral and reverse lock out cam 31 rotatably mounted upon a stub shaft 241 (see Figs. 1, 2, 4 and 6) journaled in a hollow stub 242 cast integral with the wall of the housing 54. This cam has an arm 243 to the end of which is connected one end of a link 244 adjustable as to length, the other end of which is connected to the arm 214 intermediate its ends. The cam 31 is also formed with a cam surface 245 adapted to engage a round lug 246 on an arm 247 rigid with the hub 230. The cam surface 245 is of such width and by means of the link 244 may be adjusted to such position that whenever the direction selector gear 21 is in neutral or reverse position the lug 246 will ride upon the cam surface 245, as shown in the drawings, with the result that the shaft 224 is rotated in a counter-clockwise direction against the opposition of the spring 231 to an extent such that the clutches 22 and 23 are positively disengaged. When the direction selector gear 21 is shifted to its forward position, the cam surface 245 is withdrawn from the lug 246, thereby releasing the clutches to the spring 231 in so far as the manual direction selector control is concerned. This control obviously is provided to hold the clutches 22 and 23 positively disengaged when the selector gear is in neutral or reverse to avoid injury to the transmission, particularly when the selector gear is in reverse position.

The control by the automatic clutch C, which is superimposed upon the control of the clutches 22 and 23, comprises in the main the master cam MC, best seen in Figs. 1 and 4. This cam is pivotally mounted at one end on the shaft 130 intermediate the multi-armed member 199 and the housing 40, and extends generally rearwardly from the member 199 toward the arm 247 fixed on the projecting end of the shaft 224. While the cam is pivotally mounted on the shaft 130, it is constrained to move therewith in one direction by means of an adjusting screw 248 carried by the cam and disposed to abut the bottom edge of an arm 249 of the multi-armed member 199. By this means the member 199 and the shaft 130 may move relative to the cam MC in a counter-clockwise direction, as viewed in Figs. 1 and 4, but in a clockwise movement the arm 249 abuts the screw 248 to carry the cam with it. At its free end the master cam is made of considerable width and has its edge formed with a surface 250 and a cam surface 251 of the same radius and spaced by a notch 252. On the side of the cam surface 251 opposite the notch 252 is a second cam surface 253 of a radius slightly less than the surfaces 250 and 251. These cam surfaces are adapted to cooperate with a stud 254 formed on the outside of the arm 247. In order that the stud 254 may pass from the notch 252 and the surface 253 to the surface 251, the edges between the surface 251 and the surface 253 and the notch 252 are inclined. The edge between the notch 252 and the surface 250, however, is not inclined but is so disposed as to prevent the stud 254 from passing onto the surface 250 for a purpose which will later become apparent.

When the master cam is shifted to a position such that the stud 254 rides on the surface 251, the shaft 224 is rocked in a counter-clockwise direction to such a position as positively to disengage the clutches 22 and 23. However, when the master cam is so shifted that the stud 254 is disposed in the notch 252, the clutches are restored to the influence of the spring 231 permitting them, in so far as the master cam is concerned, to be urged toward engaged position. When the master cam is shifted so that the stud 254 rides on the surface 253, a partial engagement of the clutch 22 is permitted. The position of the master cam shown in Figs. 1 and 4, in which the stud 254 rides on the surface 251, corresponds to the automatic idle position of the clutch C. When the stud 254 is in the notch 252, the cam position corresponds to the automatic engaged position of the clutch C, while when the stud 254 rides on the surface 253 the cam position corresponds to the manually engaged position of the clutch.

In order that the master cam may be shifted to its various positions, a tension spring 257 is anchored at one end at 258 on the clutch housing 40, and at its other end is anchored to the master cam by means of a pin 259. This spring tends to swing the master cam in a counter-clockwise direction as viewed in Figs. 1 and 4, thereby causing the adjusting screw 248 to abut the arm 249 and through the arm tending to rock the shaft 130 to maintain the yoke 129 in contact with the collar 126, which in turn is thereby tended to be held in contact with the inner ends of the fingers 119 of the clutch C. Spring 257 is stronger than the spring 127, so that such movement of the collar 126 may be effected by the spring 257. However, the spring 257 is much weaker than the main clutch springs 74 which tend to pivot the fingers 119 in a counter-clockwise direction, as viewed in Fig. 3, and thus oppose movement of the collar 126 by the spring 257. As a result, when the clutch C is being driven at idling speed of the engine, and normally when the clutch is stationary, the collar 126 is held in the automatic idle position and accordingly the master cam through the arm 249 and screw 248 is held in the position shown in Figs. 1 and 4 with the stud 254 riding upon the cam surface 251. As a consequence the clutches 22 and 23 are positively held disengaged as previously described, so that there can be no engagement of those clutches so long as the engine is operating merely at idling speed. Upon increase of the engine speed above idling, the centrifugal weights of the clutch are energized causing the clutch to become engaged and, as an incident to such engagement, the fingers 119 are pivoted slightly in a clockwise direction, as viewed in Fig. 3. With such movement of the fingers, the spring 257 is now capable of swinging the master cam and, through the screw 248 and the arm 249, shifting the collar 126 to the automatically engaged position of the clutch. As a result the stud 254 drops into the notch 252, thereby releasing the clutches 22 and 23 to the influence of the spring 231, enabling them to be urged toward engaged position. When the stud 254 is in the notch 252, it abuts the edge between the notch and the surface 250 which, as previously stated, is of such a nature as to prevent the stud 254 from being cammed out of the notch and, preferably, this edge is so positioned that the cam is arrested slightly short of the full extent of movement which would be permitted by the pivoting of the fingers 119 of the clutch C. As a consequence, the spring 127 is free to hold the collar 126 just short of engagement with the fingers 119 in order that the collar need not be driven at the high rotative speeds occurring during the time when the clutch is engaged. When the engine and the clutch again drop to idling speed, the clutch springs 74 overcome the centrifugal weights causing the clutch to be disengaged and at the same time causing the clutch fingers 119 to be pivoted in a counter-clockwise direction thereby forcefully restoring the collar 126 to the automatic idling position of the clutch. This movement of the collar 126 rocks the shaft 130 and, through the arm 249 of the member 199, causes the master cam to be swung in a clockwise direction which in turn positively disengages the clutches 22 and 23. It will be apparent from the foregoing that initiation of movement of the vehicle, that is, engagement of the automatic clutch and also changes in the gear ratio of the transmission, that is, shifting of clutches 22 and 23, are both under the control of the centrifugal weights of the automatic clutch.

As previously described, a complete depression of the clutch pedal 27 shifts the clutch to its manual disengaged position through the medium of the finger 202 and the bolt 201 on the arm 200 of the multi-armed member 199 fixed on the shaft 130. Such rocking of the shaft 130, however, does not cause a corresponding movement of the master cam because the latter is pivotally mounted upon the shaft and because of the relative counter-clockwise movement of the member 199 permitted by the arm 249 and the screw 248. Thus during such shift of the clutch to its manual disengaged position, the master cam MC remains in the position shown in Figs. 1 and 4 in which the stud 254 rides on the cam surface 251 with the result that the clutches 22 and 23 are retained in positively disengaged position.

As previously stated, during idling speed of the engine and normally when the engine is dead, the clutch is held in its automatic idle position in which it is disengaged. In the present instance the clutch is held in its automatic idle position by means responsive to the engine operation and herein this means takes the form of a vacuum device 33 mounted on a bracket 262 (see Figs. 1, 2 and 4) bolted to the clutch housing 40 adjacent the projecting end of the shaft 130. The vacuum device per se is of conventional construction and comprises a flexible diaphragm 261, see Fig. 14, carrying a rod 263 projecting outwardly of the device. A conduit 264 connects the device to the intake manifold 265 of the engine B so that the depression in the manifold caused by operation of the engine tends to withdraw the rod 263 into the device. A spring 261' contained within the device tends to urge the diaphragm in a direction causing the rod 263 to be projected from the device. The projecting end of the rod 263 is pivotally connected to one arm of a crank 266 pivotally mounted at 267 upon the clutch housing 40. The other arm 268 of the crank is disposed in the plane of movement of an adjusting screw 269 carried by an arm 270 of the multi-armed member 199. When the crank 266 is disposed in the position shown in Fig. 4, which is the withdrawn position of the rod 263, the screw 269 abuts the end of the arm 268 with the result that the clockwise movement of the shaft 130 under the influence of the clutch C when rotating at engine idling speed, or when stationary, is limited and holds the clutch in the automatic idle position. This position of the crank 266 is assumed whenever the engine is operating. Moreover, since the automatic clutch becomes disengaged when the engine drops to idling speed, while the vacuum device is operated even at idling speed of the engine, the screw 269 will engage the arm 268 when the vehicle is brought to rest and the engine stopped. The pressure applied by the automatic clutch will then cause the crank 266 to remain in the position shown in Fig. 4 against the opposition of the spring 261' in the vacuum device 33 which is weak and, therefore, incapable of shifting the arm 266.

Under those circumstances, the clutch may be shifted to its manually engaged position by a slight depression of the clutch pedal 27 after the engine has been stopped. Such slight depression of the clutch pedal relieves the pressure on the crank 266, permitting the spring 261' in the vacuum device to cause the rod 263 to be extended and consequently rocking the crank 266 clockwise, as viewed in Fig. 4, so that the arm 268 no longer is in the path of the screw 269. Upon release of the clutch pedal 27, the collar 126 is now free to move to the manually engaged position of the clutch, causing the clutch to become engaged and causing the master cam to be swung in a clockwise direction bringing the surface 253 in contact with the stud 254. With the stud 254 riding on the surface 253, the clutch 22 is free to engage partially. As a result the engine may now be started by pushing the vehicle, for there is a positive connection through the gearing and the clutch to the engine, or the selector gear 21 may be shifted to reverse position for locking the transmission in reverse gear to comply with requirements compelling an automotive vehicle to be left in reverse gear when parked on an incline. Preferably there is a slight clearance between the finger 202 of the clutch pedal and the bolt 201 when the means are in the position shown in Fig. 4, that is, the automatic idle position to provide for movement of the multi-armed member 199 when the crank 266 is withdrawn from limiting position with respect to the screw 269.

Means is also provided herein for manually obtaining a positive intermediate gear for deceleration or rapid acceleration of the vehicle. This means functions to shift the intermediate speed lock-up clutch element 178 which, as previously described, in engaged position cuts out the overrunning clutch 24. The clutch element 178 is shifted into or out of engaged position by means of a yoke 273 (see Figs. 2 and 6) slidable upon the rod 209 and having its bifurcated ends engaging a groove 274 formed in the clutch element 178 for that purpose. The yoke 273 is normally urged in a direction to effect engagement of the element 178 by means of a compression spring 275 encircling the rod 209 and bearing at one end on the collar of the yoke 273 encircling the rod 209 and at the other end bearing against a washer 276 secured to the rod 209.

To retain the clutch element 178 in its disengaged position, there is fixed on the end of the shaft 241 within the housing 54 an intermediate speed lock-up lever 278 having a finger 279 extending downwardly into engagement with the yoke 273. Outwardly of the housing 54 there is fixedly secured to the shaft 241 an arm 280 which has connected to the free end thereof one end of a tension spring 281, the other end of which is anchored on a bolt 282 securing the support for the sheath 288. This spring 281 is stronger than the spring 275, thereby normally retaining the clutch element 178 in disengaged position.

To permit the spring 275 to shift the clutch element 178 to engaged position, there is connected to the arm 280 a flexible but rigid cable 284, the other end of which is connected to one arm 285 of a crank 286 pivoted on a bracket 287 supported beneath the foot boards 190. The other arm of the crank carries the second speed lock-up pedal 32 which herein is located to the left and below the clutch pedal 27. The cable 283 is preferably encased throughout the major portion of its length in a sheath 288 to add rigidity to the cable and enable the same to rock the shaft 241 in a clockwise direction, as viewed in Fig. 1, when the pedal 32 is depressed. Preferably the sheath 288 is rigidly supported at its ends by the bracket 287 and by a clamp 289 mounted on the bolt 282. When the pedal 32 is depressed, the clutch element 178 is freed to the influence of the spring 275 and it is then yieldably urged to engaged position so as to avoid injury which might result from positively shifting the clutch to engaged position. Final engagement of the clutch element 178 and the clutch teeth 176 will take place when the speed of the clutch element 178 and the gear 147 is synchronized. In certain instances, particularly when the shift is from high to intermediate, synchronization of the elements of the clutch is effected by a slight speeding up of the engine as will become more apparent in the description of the operation.

Associated with the intermediate speed lock-up means is a control of the high speed clutch 22 for positively disengaging the same when the intermediate speed lock-up clutch is engaged. To that end there is pivotally mounted upon the shaft 224 a lever 291 carrying at its free end a stud 292 disposed to engage a cam surface 293 formed on the lever 278. Intermediate its ends (see Fig. 2) the lever 291 carries a lug 294 disposed to abut a screw 295 adjustably carried by the yoke 222 of the high speed clutch. The screw 295 is so adjusted that when the lever 278 is swung by depression of the pedal 32 the clutch element 182 will be disengaged through the mechanism just described to the extent shown in Fig. 9. The shift of the high speed clutch element 182 will be effected without disengagement of the intermediate speed clutch 23. With the elements of the clutch 22 positively disengaged to the extent shown in Fig. 9, the shaft 49 may still overrun the element 182, which is the normal condition, because of the beveled faces of the clutch teeth 181 and particularly because of the sharp bevel on the trailing sides of the teeth 181. At the same time the shaft 49 is prevented from dropping below the speed of the element 182.

*Operation*

Having described in detail the structure of the clutch, the gearing and the control means therefor, the operation of the transmission will now be described. Let it be assumed that the engine is dead and that the clutch is in its automatic idle position, and that the direction selector control means is in neutral position. The clutch, the gearing and the control means therefor are in the positions shown in the drawings. To start the vehicle the operator then simply starts the engine and permits the same to run at idling speed. This may be done without necessity of depressing the clutch pedal 27. Next the operator shifts the handle 28 either rearwardly if he wishes to place the transmission in reverse gear for backing out of a garage, for example, or forwardly if he wishes to place the transmission in forward gear. This selection of direction of movement may also be made without depressing the clutch pedal 27 because, so long as the engine is operating at idling speed, there is no rotation of any of the gearing. Should the handle 28 be shifted rearwardly, the selector gear 21 would be shifted into mesh with the gear 150 to place the transmission in reverse gear so that upon acceleration of the engine above idling speed the vehicle would be moved in the rearward direction.

For the sake of brevity, let it be assumed that the handle 28 is shifted forwardly with the result that the gear 21 is caused to mesh with the gear 160. As an incident to such shift of the gear 21 to forward position the neutral and reverse lock out cam 31 is rocked in a clockwise direction as viewed in Fig. 1 withdrawing the same from engagement with the stud 246, which cam in neutral position had been effective positively to disengage the high and intermediate speed clutches 22 and 23. With the cam 31 withdrawn, the clutches 22 and 23, in so far as the direction selection control means is concerned, are free to be shifted to engaged position. Such shift, however, is prevented at this time by the master cam MC whose cam surface 251 engages the stud 254 and thereby continues to hold the clutches 22 and 23 positively disengaged. The transmission is now in low gear and conditioned to impart a forward movement to the vehicle.

To initiate the forward movement, the operator of the vehicle simply accelerates the speed of the engine by depressing the accelerator pedal 30. As a result, the centrifugal weights 76 are thrown outwardly by the centrifugal force and, through the linkage connecting the same with the arms 105, cause the toggle mechanism of which the arms 105 are a part to effect engagement of the main clutch C. As a result the vehicle is now driven in low gear through the clutch C, the shaft 49, gears 148 and 147, counter shaft sleeve 145, overrunning clutch 25 and gears 160 and 21, the latter being splined to the driven shaft D². As an incident to such engagement of the clutch C through the action of the centrifugal weights 76, the fingers 119 of the clutch are pivoted in a clockwise direction, as viewed in Fig. 3, to the automatically engaged position of the clutch. This pivoting of the fingers 119 permits the spring 257 to swing the master cam in a counter-clockwise direction, as viewed in Fig. 1, with the result that the stud 254 drops into the notch 252 of the cam. The clutch elements 182 and 173 of the high and intermediate speed clutches, respectively, are now completely freed and restored to the influence of the spring 231 which yieldably urges them to engaged position. Engagement of the clutches at this time, however, does not take place because, due to the difference in gear ratios, both the shaft 49 and the gear 170 are rotating faster than the complementary clutch element. As a result the beveled faces of the clutch teeth (see Fig. 9) maintain the cooperating elements of the clutches separated.

At such time as the operator chooses to shift to intermediate gear he may do so regardless of the speed of the vehicle simply by manipulation of the accelerator pedal 30. More particularly, the operator lets up on the accelerator pedal so as to reduce the speed of the engine until it is synchronized with that of the driven shaft D² at the intermediate gear ratio. In other words, the speed of the engine is reduced until the gear 170 drops down to or just a fraction below synchronism with the clutch element 173. When that point is reached, the jaw teeth 172 are shifted into final engagement with the teeth 171 under the influence of one of the springs 239 which had been tensioned by a rocking of the shaft 224 by the spring 231. It is to be noted that because independent springs 239 are provided for each of the clutches 22 and 23 the clutch 23 may be finally engaged at this time without a corresponding engagement of the high speed clutch 22. With the clutch 23 engaged, the transmission is now in intermediate gear and the drive from the engine to the driven shaft D² is through the main clutch, shaft 49, gears 148 and 147, overrunning clutch 24, gears 169 and 170, and jaw clutch 23, the shiftable element 173 of which is splined to the driven shaft D².

With the transmission in intermediate gear, the high speed clutch 22 still continues to overrun because the shaft 49 is still rotating at a higher speed than the clutch element 182, because of the difference in gear ratios. At the same time the overrunning clutch 25 permits the transmission to operate in intermediate gear without shifting the gear 21 out of mesh with the gear 160 of the low gear train. The gear 160 and the sleeve 159 upon which it is formed are now rotating faster than the counter shaft sleeve 145, but such operation is permitted because of the overrunning clutch 25.

The shift from intermediate to high again is effected at the will of the operator at such time as he may choose and irrespective of the speed of the vehicle. To effect the shift from intermediate to high the operator again simply lets up on the accelerator pedal 30 to reduce the speed of the engine to that of the driven shaft D² at the high gear ratio. In other words, the speed of the engine is reduced to the speed of the driven shaft D². When the clutch teeth 180 are reduced down to or just slightly below synchronism with the clutch teeth 181, final engagement of the high speed clutch 22 is effected under the influence of the spring 239 which had previously been tensioned by a rocking of the shaft 224 by the spring 231. The transmission is now in high gear with the drive directly from the shaft 49 to the driven shaft D² through the clutch 22. Under this condition both the overrunning clutch 25 in the low gear train and the overrunning clutch 24 in the intermediate gear train are effective to permit portions of those gear trains to be driven from the driven shaft D². The transmission will now remain in high gear until the speed of the engine is permitted to drop to idling speed or until the transmission is shifted manually.

The vehicle is brought to rest simply by permitting the engine to drop to idling speed. Under those conditions the automatic clutch C would become disengaged and, as an incident to such disengagement, the fingers 119 would shift the collar 126 to the automatic idle position of the clutch as an incident to which the master cam would be returned to the position shown in Fig. 1, thereby positively disengaging the high and intermediate speed clutches 22 and 23 through the medium of the stud 254, arm 247, shaft 222 and the rod connected to the shaft. The transmission would then be in low gear and forward movement of the vehicle would again be initiated simply by accelerating the engine by depressing the accelerator pedal 30. The engine may be disconnected from the transmission at any time by the operator simply by depressing the conventional clutch pedal 27. Such depression of the clutch pedal disengages the automatic clutch regardless of the speed of the engine. Depression of the clutch pedal 27, however, does not shift the master cam MC. Thus if the clutch pedal is depressed while the cam is in the automatic idle position, shown in Figs. 1 and 4, the high and intermediate speed clutches 22 and 23 are held disengaged regardless of the manipulation of the clutch pedal. If the clutch pedal is depressed while the master cam is in the automatic engaged position, that is, with the stud 254 in the notch 252 the high and intermediate speed clutches remain engaged so long as the clutch pedal is depressed and would continue in engaged position if the clutch pedal is released prior to the time that the engine drops down to idling speed, but would be disengaged by shift of the master cam as a result of automatic disengagement of the clutch should the clutch pedal be released after the engine has dropped down to idling speed.

Should the operator desire to shift to a positive intermediate gear in order to employ the engine for rapidly braking the car or to obtain rapid acceleration, this may be done by depressing the pedal 32 and maintaining the same depressed during the time that such positive intermediate gear is desired. Depression of the pedal 32 through the cable 283 rocks the shaft 241, thereby releasing the yoke 273 to the influence of the spring 275. The spring then urges the clutch element 178 toward engagement with the teeth 176 causing the teeth to assume the position shown in Fig. 10. Since the shift to positive intermediate is normally made from high gear, the teeth 176 and 177 will be rotated in the direction indicated by the arrows in Fig. 10, and with the teeth 177 rotating more rapidly than the teeth 176. As a result, due to the beveled faces of the teeth 176 and 177, the clutch will not be engaged and, to effect such engagement, the engine will have to be accelerated slightly to bring the gear 147 into synchronism with the clutch element 178. When that condition is reached, the clutch becomes finally engaged and such engagement is maintained simply by maintaining the pedal 32 depressed regardless of whether the engine is employed for accelerating the vehicle or for braking the vehicle. When the intermediate speed lock-up clutch is engaged, the overrunning clutch 24 is, of course, locked out so as to provide a positive geared connection between the driven shaft $D^2$ and the engine.

Rocking of the shaft 241 by depression of the pedal 32 also serves to disengage partially the high speed clutch 22, in order that the intermediate speed gear ratio may be effective. This partial disengagement of the clutch is effected through the arm 291 and is to the extent shown in Fig. 9, which permits the shaft 49 to overrun the clutch element 182 but prevents the shaft 49 from dropping below the speed of the element 182 so as to facilitate and assure engagement of the clutch 22 when the pedal 32 is released.

Should the operator desire to obtain a positive engagement of the clutch when the engine is dead, so that the transmission may be locked in reverse gear for parking the vehicle on an incline, or for enabling the engine to be started by pushing the vehicle, this is readily done simply by momentarily depressing the clutch pedal 27 after the engine is dead. By so depressing the clutch pedal the pressure of the screw 269 on the arm 268 is relieved thereby enabling the spring in the vacuum device 33 to swing the crank 266 and withdraw the arm 268 from the path of the screw 269. With the rocking of the shaft 130 no longer limited by abutment of the screw 269 with the arm 268, the clutch is free to engage positively and the master cam is swung to a position in which its surface 253 engages the stud 254. This enables the high speed clutch 22 to engage sufficiently for purposes of driving the engine by pushing the vehicle. With the clutch positively engaged, the gear 21 may also be shifted to reverse position, thereby providing a positive gear connection between the driven shaft and the engine for parking purposes.

It is pointed out in connection with the statement that the shift from low to intermediate and from intermediate to high may be made at the will of the operator, irrespective of the speed of the vehicle, that that statement is intended to mean that the shifts may be made irrespective of the speed of the vehicle so long as it is above certain minimum speeds dictated by the idling speed of the engine and the ratio of the gear to which the transmission is to be shifted. In the case of the shift from intermediate to high, this speed is the idling speed of the engine, that is, the vehicle must be moving rapidly enough so that driven shaft $D^2$ is slightly above the idling speed of the engine, so that the clutch teeth 180 may be dropped down to synchronous speed with the clutch teeth 181 without having the engine drop to idling speed. In the shift from low to intermediate, the speed of movement of the vehicle may be substantially less in that under those circumstances the driven shaft $D^2$ needs to rotate only slightly above the speed at which the gear 170 rotates at idling speed of the engine. Due to the reduction gearing between the engine and the gear 170, this speed, of course, is substantially lower than the idling speed of the engine. Thus, except for these minimum speeds which are so low as normally to be exceeded before the operator would desire to make a shift, the shift from low to intermediate and from intermediate to high is independent of the speed of the vehicle.

In instances where the modified form of clutch shown in Fig. 3a and 3b is employed in place of the clutch shown in Fig. 3, the vacuum device 33 is eliminated for, as previously described, the auxiliary set of centrifugal weights performs functions which obviate the necessity of means for releasably retaining the clutch in automatic idle position. When the form of clutch shown in Figs. 3a and 3b is employed, the operation of the transmission differs only in that the clutch pedal 27 is preferably depressed to disengage the clutch for starting the engine so as to relieve it from the load applied by the gearing. Once the engine has been started and is operating at idling speed, the automatic clutch is disengaged so that the shift of the selector gear 21 may still be made without necessity of depressing the clutch pedal 27.

I claim as my invention:

1. In an automatic transmission, a drive shaft, a driven shaft, an automatic clutch having a driving part, a driven part and speed responsive means determining engagement or disengagement of said parts, gearing operatively interposed between said driven shaft and the driven part of said automatic clutch including a plurality of clutches effective upon engagement to produce gear trains of differing gear ratios, and means controlled by the speed responsive means of said automatic clutch exercising control over the engagement of said plurality of clutches.

2. In an automatic transmission for an automotive vehicle, a drive shaft, a driven shaft, an automatic clutch having a driving part, a driven part and means including centrifugal weights operable to effect engagement of said driving and driven parts when the rotative speed of said driving part exceeds the normal idling speed of the engine of the vehicle, gearing operatively interposed between said driven shaft and the driven part of said clutch including a clutch effective upon engagement to change the gear ratio of the transmission, and means controlled by said centrifugal weights retaining said last named clutch disengaged while the automatic clutch is below idling speed.

3. In an automatic transmission, a drive shaft, a driven shaft, an automatic clutch having a driving and a driven part, gearing operatively interposed between said driven shaft and the driven part of said clutch including a plurality of clutches for effecting different gear trains upon engagement thereof to obtain different gear ratios in the transmission, means for cocking said plurality of clutches toward engaged position, means controlled by said automatic clutch operable when the automatic clutch is disengaged to retain said clutches in uncocked position and operable when said automatic clutch is engaged to permit cocking of the plurality of clutches, and means for determining the time of final engagement of said plurality of clutches.

4. In an automatic transmission, a drive shaft, a driven shaft, an automatic clutch having a driving and driven part, and an automatic engaged and an automatic disengaged position, gearing operatively interposed between said driven shaft and the driven part of said clutch including an overrunning jaw clutch, means operable to cock said jaw clutch toward engaged position, means controlled by said automatic clutch operable when the automatic clutch is in automatic disengaged position for positively retaining said jaw clutch disengaged and operable when the automatic clutch is in automatic engaged position to release said jaw clutch to said cocking means, and means for determining the time of final engagement of said jaw clutch.

5. In an automatic transmission, a drive shaft, a driven shaft, an automatic clutch having a driving and a driven part, and an automatic engaged and an automatic disengaged position, gearing operatively interposed between said driven shaft and the driven part of said clutch including a plurality of overrunning jaw clutches, each comprising a clutch element driven from the driven part of said automatic clutch and a shiftable element operatively connected with said driven shaft, means for cocking said shiftable element of said clutches individually, means controlled by the automatic clutch operable when the automatic clutch is in automatic disengaged position positively to retain said clutches disengaged and operable when said automatic clutch is in automatic engaged position to release said shiftable clutch elements to said cocking means, and means for determining the time of final engagement of said clutches individually.

6. In an automatic transmission, a drive shaft, a driven shaft, an automatic clutch having a driving and a driven part, and an automatic engaged and an automatic disengaged position, gearing operatively interposed between said driven shaft and the driven part of said clutch including an overrunning jaw clutch, means operable to cock said jaw clutch toward engaged position including a rockable shaft and an arm fixed on said shaft and carrying a cam follower, said cocking means being operable when said shaft is rocked in one direction to cock said jaw clutch and operable when rocked in the opposite direction positively to disengage said jaw clutch, means including a cam having different surfaces for engaging said follower controlled by said automatic clutch and operable when the automatic clutch is in automatic disengaged position for positively retaining said jaw clutch disengaged and operable when the automatic clutch is in automatic engaged position to release said jaw clutch to said cocking means, and means for determining the time of final engagement of said jaw clutch.

7. In an automatic transmission, an automatic clutch, gearing driven through said clutch including an overrunning jaw clutch having a shiftable clutch element, a housing for said clutch and for said gearing, a shaft extending transversely of said housing for said gearing, a yoke for shifting the shiftable clutch element rotatably mounted on said shaft, cocking means for said shiftable clutch element comprising an arm fixed on said shaft, a rod secured to the free end of said arm and extending through a portion of said yoke, and a spring encircling said rod and fixed at one end on the rod and at the other end engaging said yoke, said cocking mechanism being so arranged with respect to said yoke positively to shift the shiftable clutch element to disengaged position when the shaft is rocked in one direction and yieldably to urge the cultch element toward engaged position when the shaft is rocked in the opposite direction, a torsion spring for rocking said shaft in a direction to cock the cocking mechanism, an arm fixed on the projecting end of said shaft having a cam follower thereon, and a cam controlled by said automatic clutch operable when the automatic clutch is in its automatic disengaged position to rock said shaft in a direction positively to disengage said overrunning clutch and operable when the automatic clutch is in its automatic engaged position to release said shaft to the action of said torsion spring.

8. An automatic transmission comprising in combination, a drive shaft, a driven shaft, an automatic clutch having a driving and a driven part, and having an automatic disengaged position and an automatic engaged position, gearing operatively interposed between said driven shaft and the driven part of said automatic clutch including a low speed direction selector gear shiftable to neutral, forward or reverse and gear ratio changing means for obtaining intermediate and high gear, means for urging said ratio changing means in a direction to effect a shift in the transmission, and control means comprising manual means for shifting the direction selector gear to neutral, forward or reverse position, means operable with said direction selector control means for positively retaining said ratio changing means inoperative when the direction selector gear is in neutral or reverse position, automatic clutch control means operable when the clutch is in automatic disengaged position to retain the ratio changing means inoperative and operable when the automatic clutch is in automatic engaged position to release said ratio changing means to the means urging the same to effect a change in gear ratio, and manual means for determining the time of operation of the ratio changing means.

9. In an automatic transmission, a drive shaft, a driven shaft, gearing operatively interposed between said shafts including a low gear direction selector gear shiftable to forward, neutral or reverse and a gear ratio changing means, said means being disengaged when the transmission is in low gear, manual means for shifting said selector gear to forward, neutral or reverse, and means associated therewith for maintaining said gear ratio changing means disengaged when said selector gear is in neutral or reverse.

10. An automatic transmission comprising in combination a drive shaft, a driven shaft, gearing operatively interposed between said shafts including a low speed direction selector gear shiftable to neutral, forward or reverse, and a plurality of overrunning jaw clutches engageable to obtain intermediate and high gear, and means normally operable to cock said clutches yieldably urging the same toward engaged position, and control means comprising manually operable means for shifting the direction selector gear to forward, neutral or reverse position, and means associated with said direction selector means to be actuated as an incident to actuation thereof operable positively to maintain said clutches disengaged when the direction selector gear is in neutral or reverse position and to permit said clutches to be cocked when the direction selector gear is in forward position.

11. An automatic transmission comprising in combination a drive shaft, a driven shaft, gearing operatively interposed between said shafts including a low speed direction selector gear shiftable to neutral, forward or reverse, and an overrunning jaw clutch engageable to change the gear ratio, means normally operable to cock said clutch yieldably urging the same toward engaged position including a shaft, an arm fixed on said shaft and a cam follower on said arm for rocking said shaft, and control means comprising manually operable means for shifting the direction selector gear to forward, neutral or reverse position, and a neutral and reverse lock out cam associated with said direction selector control operable to engage said cam follower and rock said cocking shaft positively to disengage said jaw clutch when said selector control is in neutral or reverse and to be disengaged from said follower when said selector control is in forward.

12. In an automatic transmission, a driving shaft, a driven shaft, gearing operatively interposed between said shafts comprising a high speed drive including a first clutch, a lower speed gear train including a second clutch and an overrunning clutch, and an overrunning jaw lock-up clutch for said overrunning clutch, and manually operable control means upon actuation thereof causing said lock-up clutch to be urged toward engaged position and simultaneously disengaging said first clutch to permit speeding up of the driving shaft to synchronize and engage the parts of the lock up clutch.

13. In an automatic transmission, a drive shaft, a driven shaft, gearing operatively interposed between said shafts comprising a high speed drive including a first overrunning jaw clutch, a lower speed gear train including a second overrunning jaw clutch and an overrunning clutch, and a lock-up clutch for said overrunning clutch, means for yieldably urging said jaw clutches toward engaged position, and manual means for effecting a positive lower gear comprising means for urging the lock-up clutch toward engaged position, and means for partially disengaging said first overrunning jaw clutch to permit speeding up of the drive shaft to synchronize and permit engagement of the parts of the lock-up clutch, while permitting said second overrunning jaw clutch to remain engaged to permit the transmission to operate in the lower gear while maintaining the transmission in a condition assuring reengagement of said first jaw clutch upon release of said manual means.

14. In an automatic transmission, a drive shaft, a driven shaft, gearing operatively interposed between said shafts comprising a high speed drive including a first jaw clutch having a driving element and an axially shiftable driven element, a lower speed gear train including a second jaw clutch and an overrunning clutch, and a lock-up clutch of the overrunning jaw type for said overrunning clutch, means for urging said jaw clutches toward engaged position, means for urging said lock-up clutch toward engaged position, a lock-up lever normally holding said lock-up clutch disengaged and having a cam surface, means including a cam follower for positively disengaging said first jaw clutch, and means for rocking said lever to a position permitting said lock-up clutch to be urged to engaged position and engaging said cam follower partially to disengage said first jaw clutch, the jaws of said first clutch being bevelled to permit overrunning of the driving element but prohibiting overrunning of the driven element while so partially disengaged.

15. An automatic transmission comprising in combination a drive shaft, a driven shaft, an automatic clutch including a driving and a driven part, gearing operatively interposed between the driven part of said clutch and said driven shaft, said gearing including a low speed direction selector gear and gear ratio changing means, and control means comprising manual means for shifting the low speed direction selector gear to neutral, forward or reverse, manual means for disengaging said automatic clutch, means associated with said direction selector means for locking out said gear ratio changing means when the direction selector gear is in neutral or reverse, automatic clutch controlled means for locking out said gear ratio changing means when the clutch is disengaged and permitting cocking of the ratio changing means when the clutch is engaged, manually actuable means for determining the time of final engagement of said ratio changing means, manual means for obtaining a geared connection between the driven part of said clutch and said driven shaft at an intermediate gear ratio, and means associated with said last named means for in part controlling said ratio changing means as an incident to the manual shift to positive intermediate gear.

16. An automatic transmission for use in an automotive vehicle comprising a drive shaft, a driven shaft, an automatic main clutch having a driving part and a driven part, gearing operatively interposed between said driven shaft and the driven part of said clutch, said gearing including a low speed direction selector gear, gear ratio changing means, an overrunning clutch normally constituting a part of the intermediate gear train and a lock-up clutch for said overrunning clutch, and control means comprising a manually operable means for shifting the direction selector gear to neutral, forward or reverse position for respectively placing the transmission in neutral, forward or reverse gear, means responsive to the operation of the engine of the automotive vehicle operating to retain said automatic clutch in automatic idle position, neutral and reverse lock out means for said ratio changing means for holding said means inoperative when the direction selector gear is in neutral or reverse position, automatic clutch controlled means for locking out said ratio changing means when the main clutch is in automatic idle position and permitting said ratio changing means to be cocked when the main clutch is in automatic engaged position, manually operable means for determining the time of operation of said ratio changing means to effect a shift of the transmission from low to intermediate or from intermediate to high gear, manually operable means for locking out the overrunning clutch to obtain a positive intermediate gear, and manual means for disengaging said main clutch or for releasing the means responsive to engine operation retaining said main clutch in automatic idle position to permit engagement of the main clutch after the engine is dead.

17. In a transmission having a driving shaft and a driven shaft, gearing operatively interposed between said shafts comprising direction selector means for determining the direction of rotation of said driven shaft in low gear, the low gear forward train including an overrunning clutch in addition to said selector means, a low gear reverse train having a geared connection only with the drive shaft, ratio selector means for connecting said driven to said driving shaft at lower gear ratios and exclusive of said direction selector means comprising a first overrunning jaw clutch for connecting said driven shaft to rotate at the speed of said driving shaft and a gear train including a second overrunning jaw clutch and an overrunning clutch for connecting said driven shaft to be driven at an intermediate speed, each of said jaw clutches being normally urged toward engaged position, and manual means for actuating said direction selector means including means positively holding said jaw clutches disengaged while said direction selector means is in neutral and releasing said jaw clutches upon shift of said direction selector means to complete a low gear forward train.

18. In a transmission having a driving shaft and a driven shaft disposed in axial alignment, gearing operatively interposed between said shafts comprising a countershaft disposed to extend parallel with and opposite said driven shaft, a driving gear on said driving shaft, a driven gear fixed on one end of said countershaft and meshing with said driving gear, a reverse gear fixed on the other end of said countershaft, an idler gear meshing therewith, a first overrunning clutch having one element fixed to rotate with said countershaft and having the other element freely rotatable upon said countershaft and formed with external gear teeth, a low speed direction selector gear splined on said driven shaft for longitudinally shifting movement into engagement with said idler gear to place the transmission in reverse gear or with the gear on the freely rotatable part of said overrunning clutch to place the transmission in low gear forward, a second overrunning clutch having one element fixed to rotate with said countershaft, and a second element freely rotatable upon said countershaft and including an external gear, a gear meshing with said last named gear rotatably mounted on said driven shaft and having clutch teeth on one face thereof, a shiftable clutch element splined on said driven shaft to rotate therewith having cooperating clutch teeth for engagement with the first mentioned clutch teeth to place the transmission into intermediate gear, clutch teeth formed on one face of said driving gear and a second shiftable clutch element splined on said driven shaft having clutch teeth engageable with the clutch teeth on said driving gear for directly connecting the driving and the driven shaft to place the transmission in high gear.

19. In an automatic transmission, an automatic clutch including a driving and a driven part, and a plurality of pivotally mounted fingers and having an automatic idle and an automatic engaged position, a collar disposed to engage the free ends of said pivotally mounted fingers, a shaft extending transversely of said transmission, a yoke fixed on said shaft and engaging said collar, gearing driven from the driven part of said clutch including a gear ratio changing clutch of the overrunning jaw type, means including a follower for urging said overrunning clutch toward engaged position, a cam pivotally mounted on said shaft and formed along one edge with a plurality of cam means engaged by the follower of the means urging the jaw clutch toward engaged position for retaining said jaw clutch wholly disengaged or permitting partial or full engagement of the clutch, a one-way connection between said cam and said shaft for preventing rotation of the cam in one direction relative to said shaft, and means for urging said cam in said last mentioned direction to urge said collar toward engagement with the fingers of said automatic clutch.

20. In an automatic transmission, a drive shaft, a driven shaft, an automatic clutch operatively interposed between said drive and driven shafts having a driving part, a driven part, and a plurality of pivotally mounted fingers and an automatic idle, an automatic engaged, and a manually disengaged position, gearing interposed between the driven shaft and the driven part of said clutch including an overrunning jaw clutch, means including a cam follower operable to urge said jaw clutch toward engaged position when freed and operable when rocked positively to disengage said overrunning jaw clutch, a clutch throwout shaft extending transversely of the transmission, a shiftable collar adapted to engage the free ends of said fingers, a yoke fixedly mounted on said shaft and engaging said collar, a multi-armed member fixed on said shaft, manually operable means adapted to engage said multi-armed member for shifting said automatic clutch to manually disengaged position, a cam pivotally mounted on said shaft and having a plurality of cam surfaces operable to engage the cam follower to retain the jaw clutch positively disengaged or to release the same for partial or full engagement, means yieldably urging said cam in a direction to release the means urging the jaw clutch toward engaged position, and a screw carried by said cam and adapted to engage one arm of the multi-armed member to produce a one-way connection permitting the shaft to be rocked by depression of said manually operable means without a corresponding movement of the cam while effecting movement of the cam by the multi-armed member with return movement of the multi-armed member by the clutch upon release of said manually operable means.

21. An automatic transmission comprising, in combination, a drive shaft, a driven shaft, an automatic clutch having a driving and a driven part, gearing operatively interposed between said driven shaft and the driven part of said automatic clutch including a low speed direction selector gear and a gear ratio changing means, manual means for actuating said direction selector gear, and means governed by said manual means and means governed by said automatic clutch exercising joint control over said gear ratio changing means.

22. An automatic transmission comprising, in combination, a drive shaft, a driven shaft, an automatic clutch having a driving and a driven part, gearing operatively interposed between said driven shaft and the driven part of said automatic clutch including a low speed direction selector gear and a gear ratio changing means, manual means for actuating said direction selector gear, manual means for exercising control over said automatic clutch, and means governed by said manual means for actuating said selector gear and means governed by said automatic clutch and the manual means exercising control over said automatic clutch jointly exercising control over said gear ratio changing means.

23. In an automatic transmission, a drive shaft, a driven shaft, an automatic clutch having a driving part, a driven part, and speed responsive means determining engagement or disengagement of said parts, gearing operatively interposed between said driven shaft and the driven part of said automatic clutch including a clutch for changing the gear ratio to shift the transmission to different gears, and means controlled by the speed responsive means of said automatic clutch exercising control of said gear ratio changing clutch.

24. An automatic transmission having a drive shaft, a driven shaft, an automatic clutch having a driving part, a driven part, and speed responsive means determining engagement or disengagement of said parts, gearing operatively interposed between said shafts comprising direction selector means for determining the direction of rotation of said driven shaft in a low gear, the low gear forward train including an overrunning clutch in addition to said selector means, the low gear reverse train having a geared connection only with the driving shaft, ratio selector means for connecting said driven to said driving shaft in other gear ratios comprising a first clutch for connecting said driven shaft to rotate at the speed of said driving shaft and a gear train including a second clutch and an overrunning clutch for connecting said driven shaft to be driven at an intermediate speed, manual means for actuating said low gear direction selector means, and automatic means controlled by the speed responsive means of said automatic clutch governing said ratio selector means to complete a high and an intermediate gear train exclusive of said manual means and while said selector means remains shifted to complete the low gear forward train.

OSCAR H. BANKER.